Sept. 27, 1932.    F. R. FAGEOL    1,880,126
RAILWAY ROLLING STOCK AND ROAD VEHICLE CONSTRUCTION
Filed April 19, 1928    15 Sheets-Sheet 1
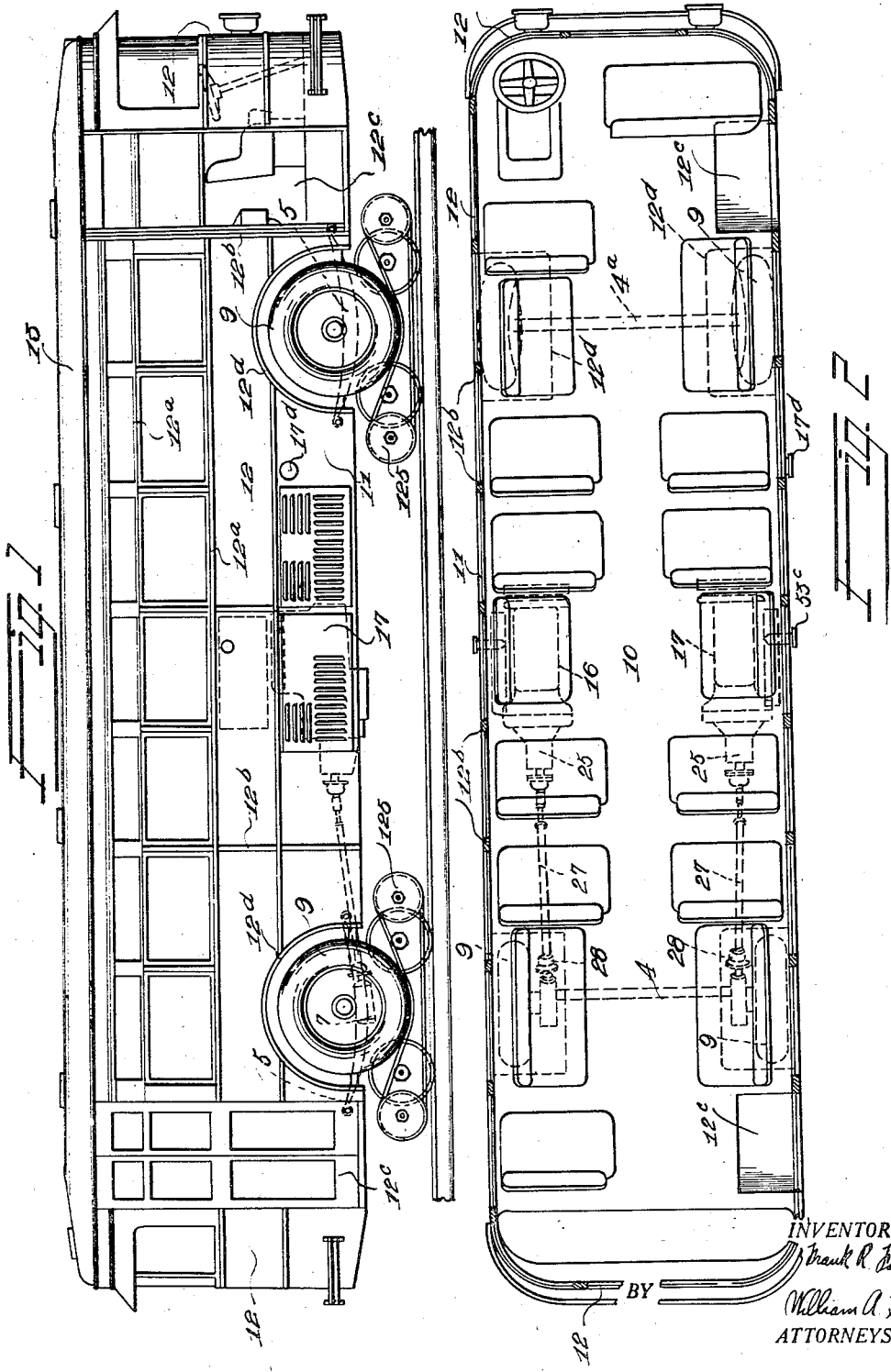
INVENTOR.
Frank R. Fageol
BY
William A. Strand
ATTORNEYS.

Sept. 27, 1932.    F. R. FAGEOL    1,880,126
RAILWAY ROLLING STOCK AND ROAD VEHICLE CONSTRUCTION
Filed April 19, 1928    15 Sheets-Sheet 2
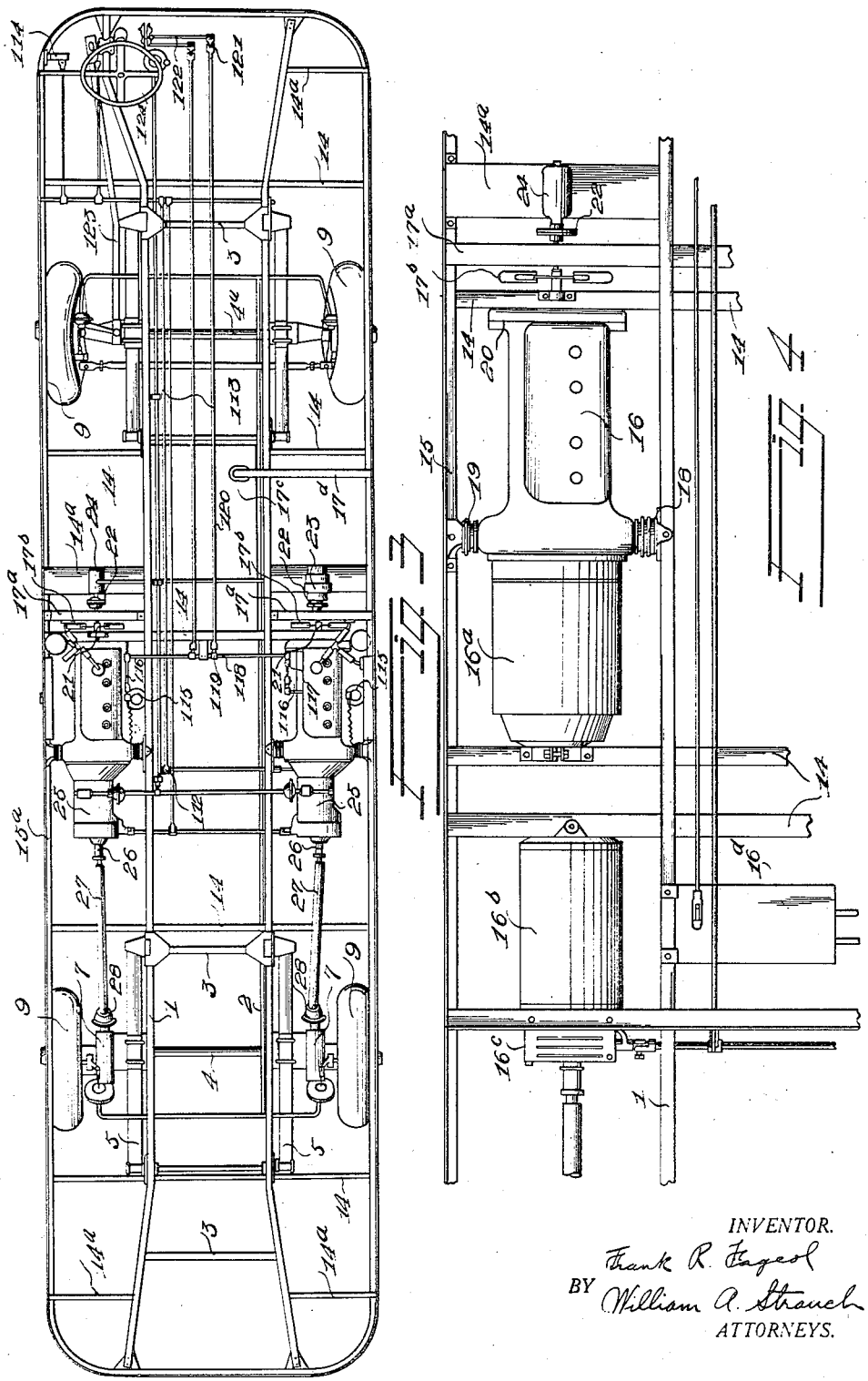
INVENTOR.
Frank R. Fageol
BY William A. Strauch
ATTORNEYS.

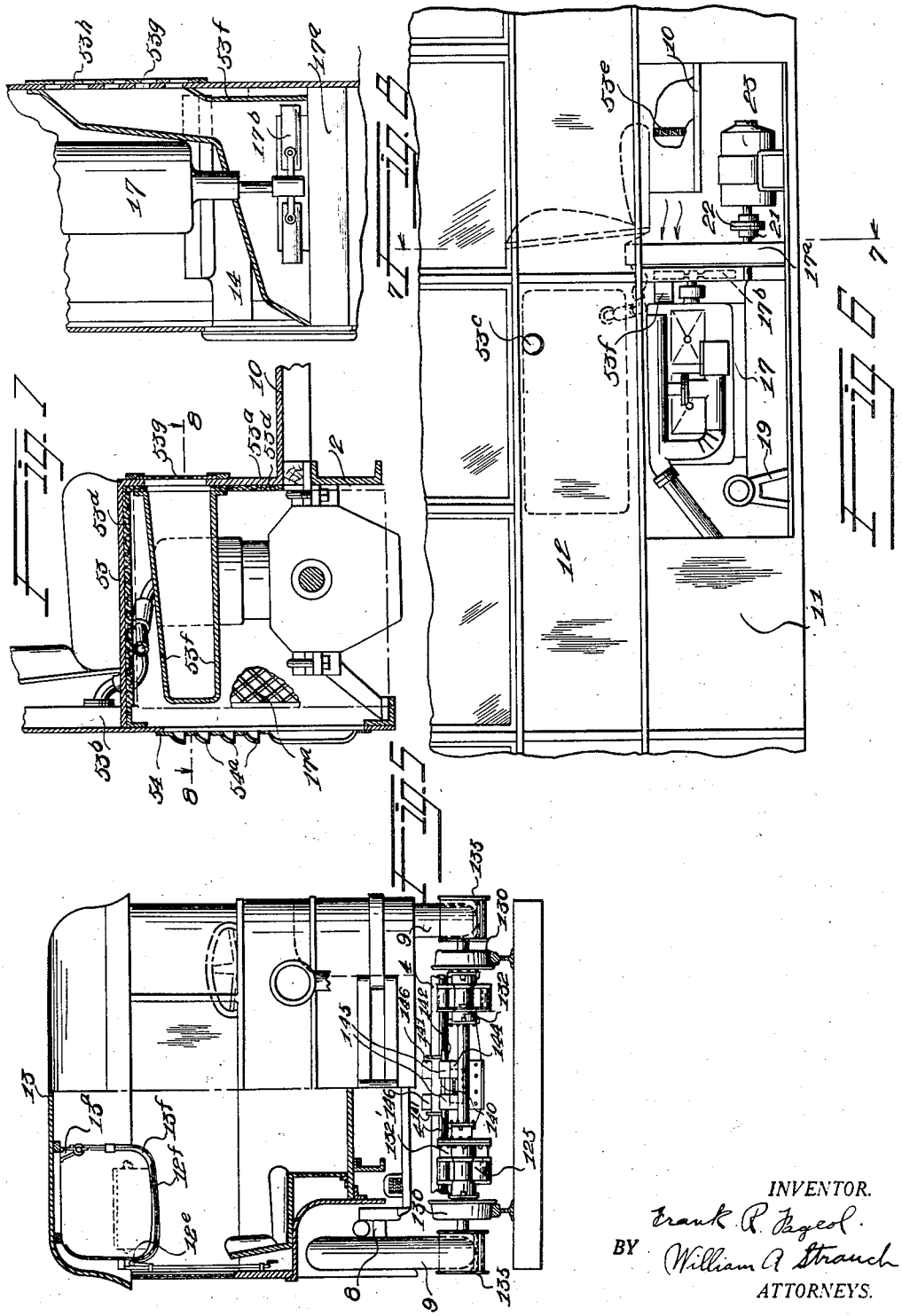

Sept. 27, 1932.　　　F. R. FAGEOL　　　1,880,126
RAILWAY ROLLING STOCK AND ROAD VEHICLE CONSTRUCTION
Filed April 19, 1928　　15 Sheets-Sheet 4
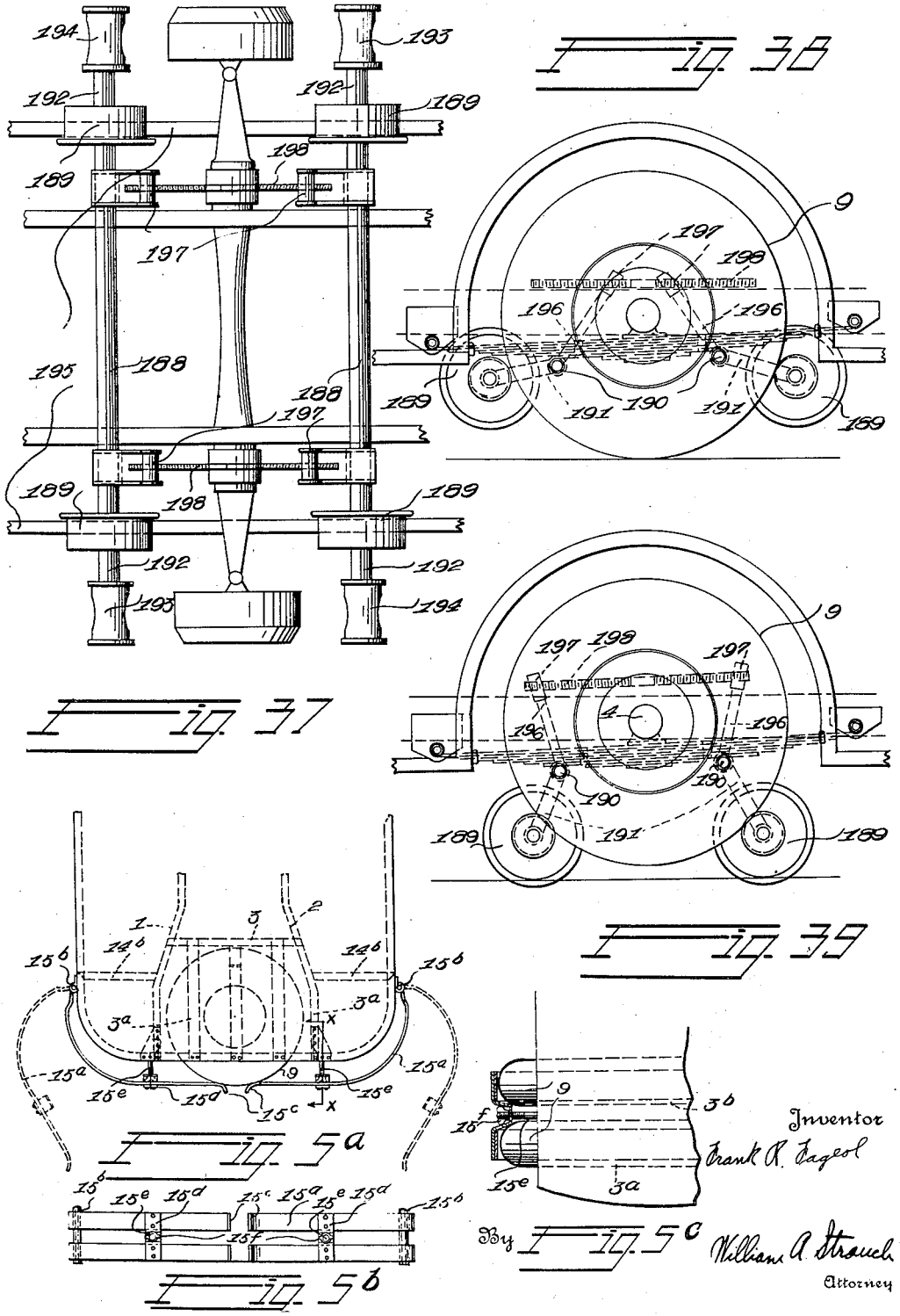

Sept. 27, 1932. F. R. FAGEOL 1,880,126
RAILWAY ROLLING STOCK AND ROAD VEHICLE CONSTRUCTION
Filed April 19, 1928 15 Sheets-Sheet 5
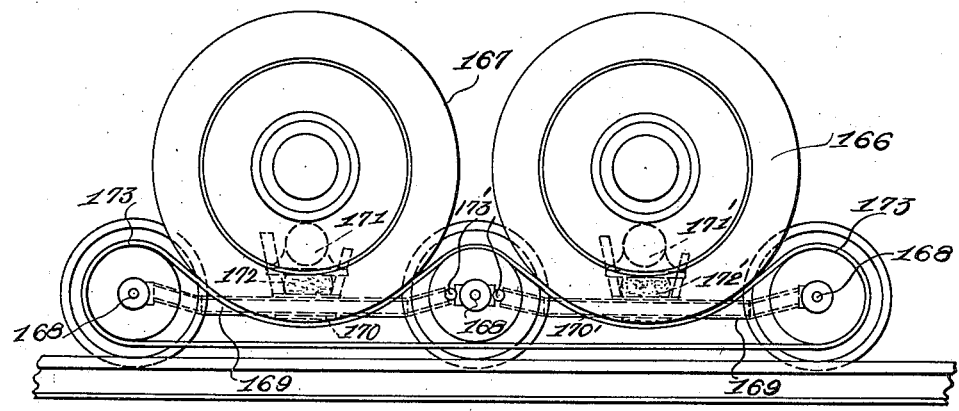
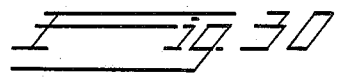
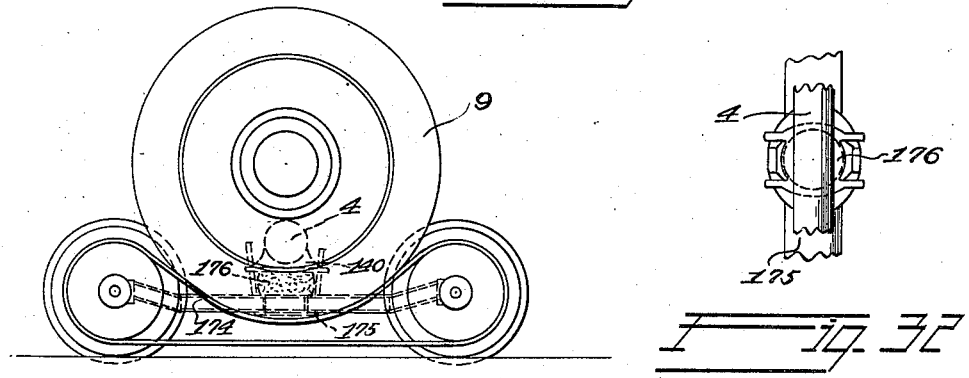
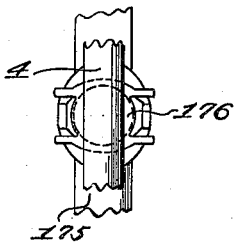
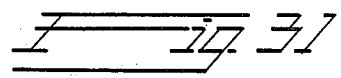
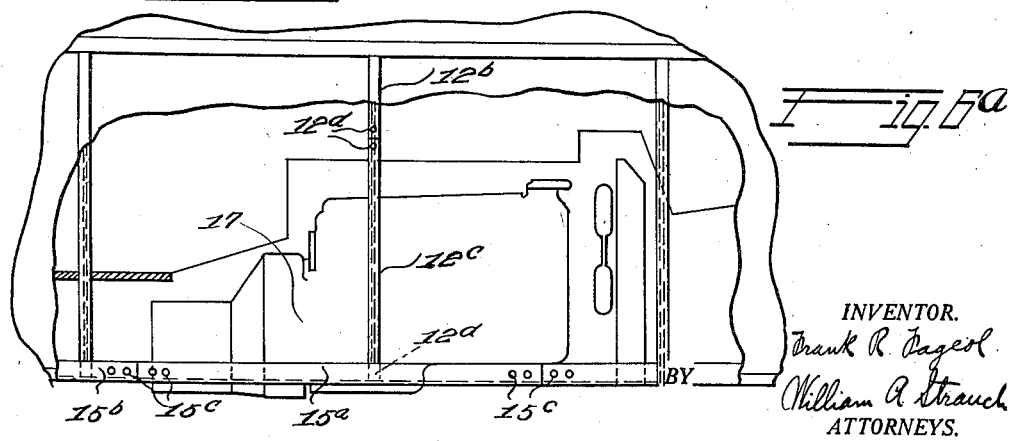
INVENTOR.
Frank R. Fageol
BY William A. Strauch
ATTORNEYS.

Sept. 27, 1932.   F. R. FAGEOL   1,880,126
RAILWAY ROLLING STOCK AND ROAD VEHICLE CONSTRUCTION
Filed April 19, 1928   15 Sheets-Sheet 6
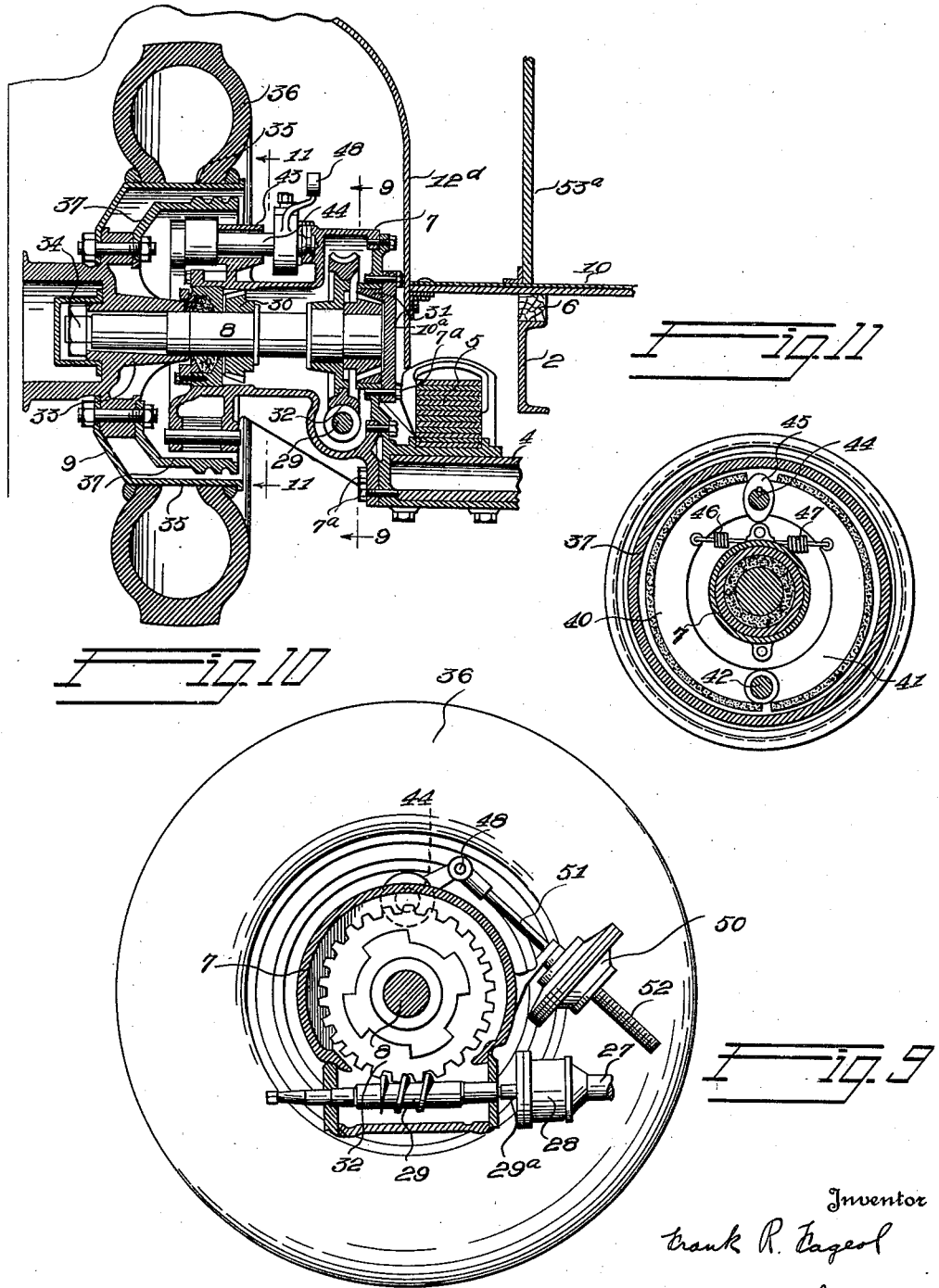

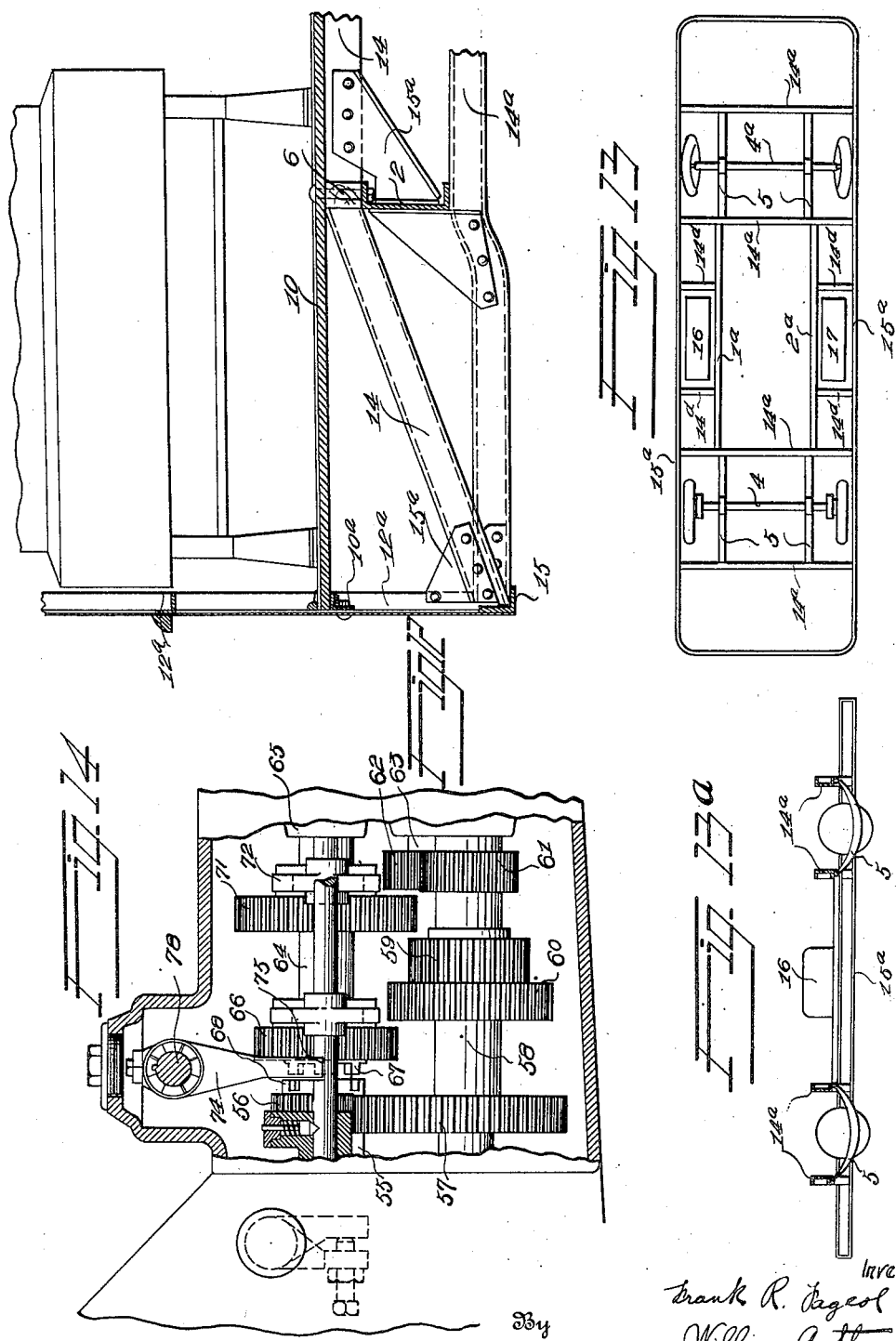

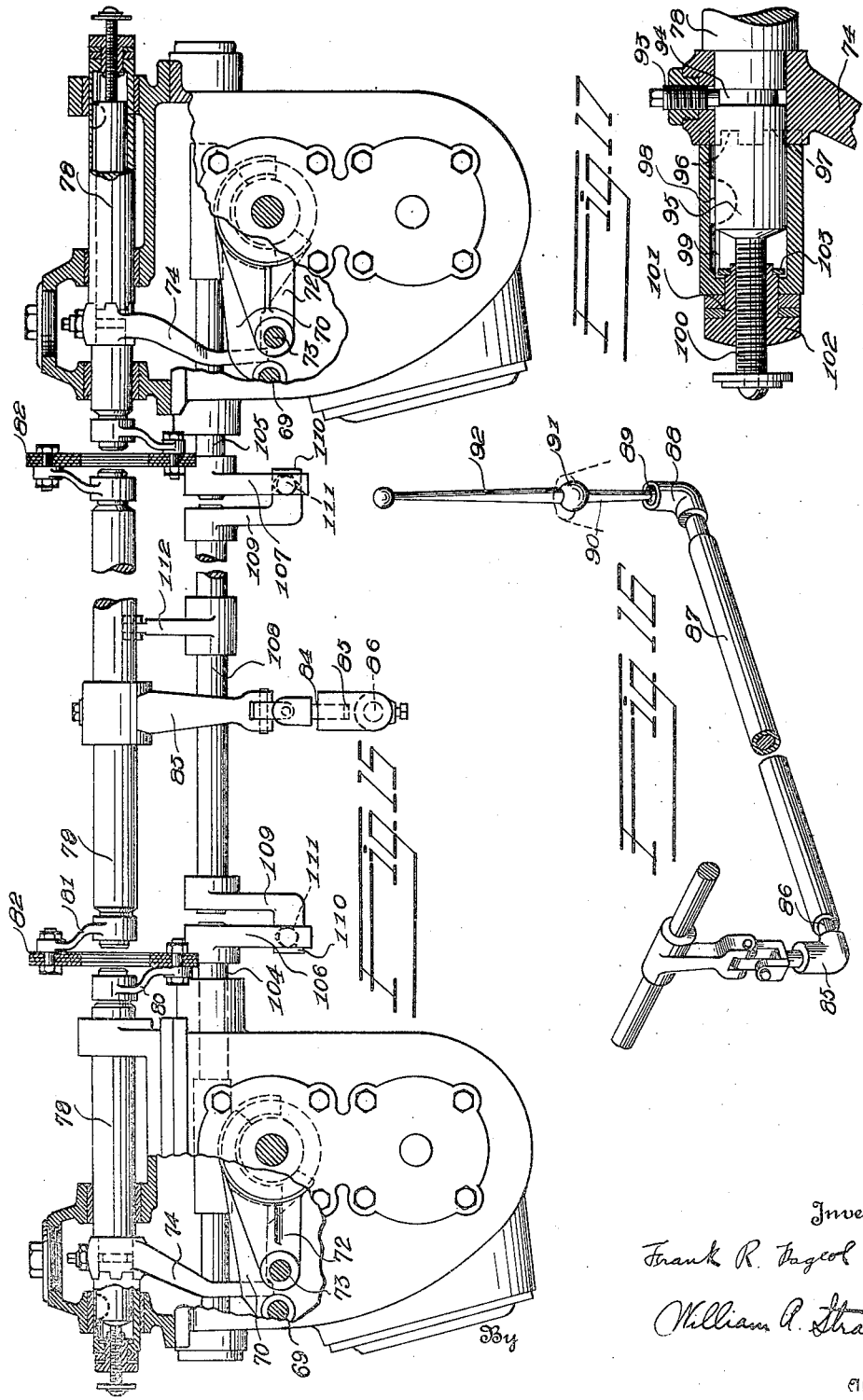

Sept. 27, 1932.  F. R. FAGEOL  1,880,126
RAILWAY ROLLING STOCK AND ROAD VEHICLE CONSTRUCTION
Filed April 19, 1928   15 Sheets-Sheet 9

INVENTOR.
Frank R. Fageol
BY William A. Strauch
ATTORNEYS.

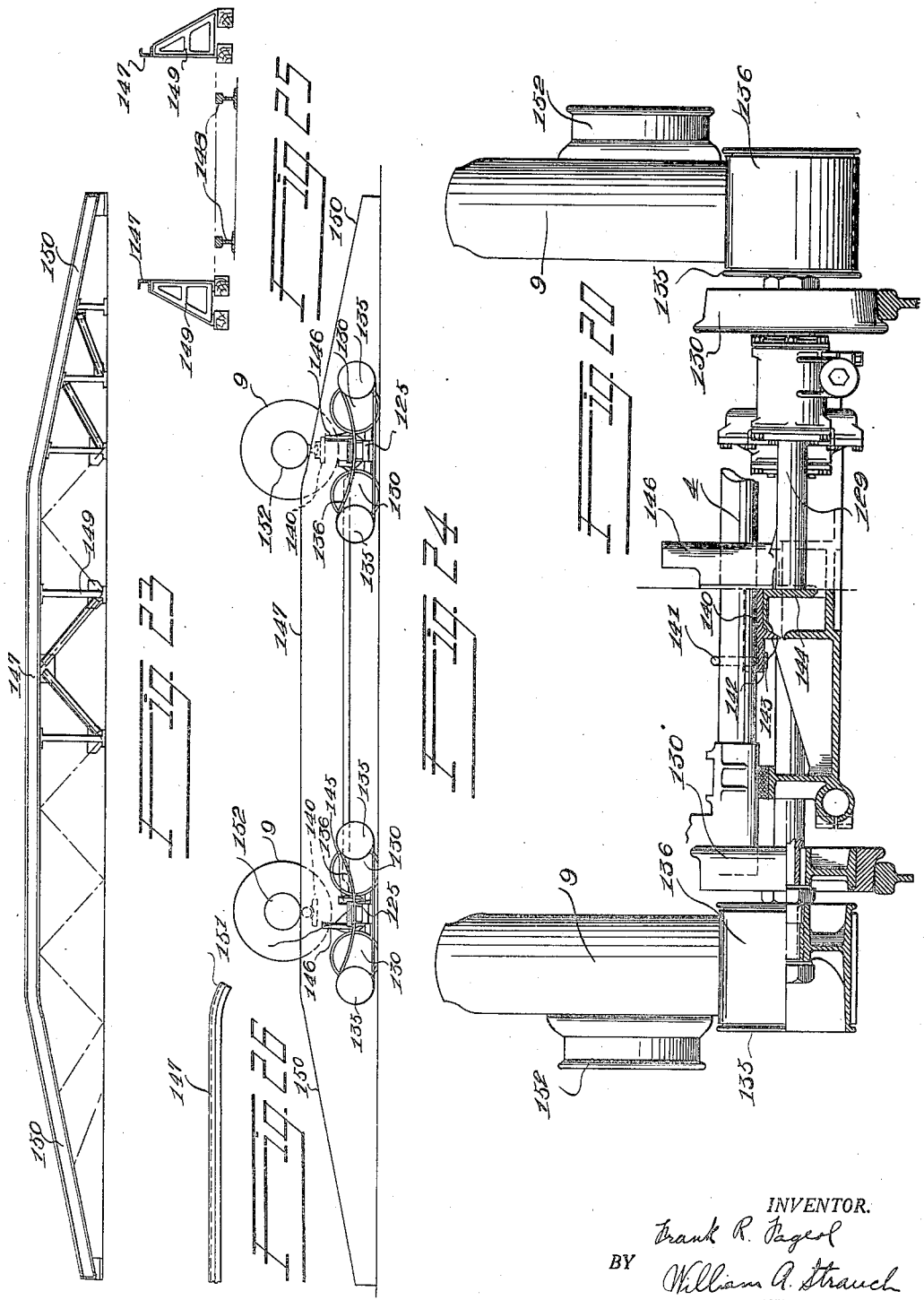

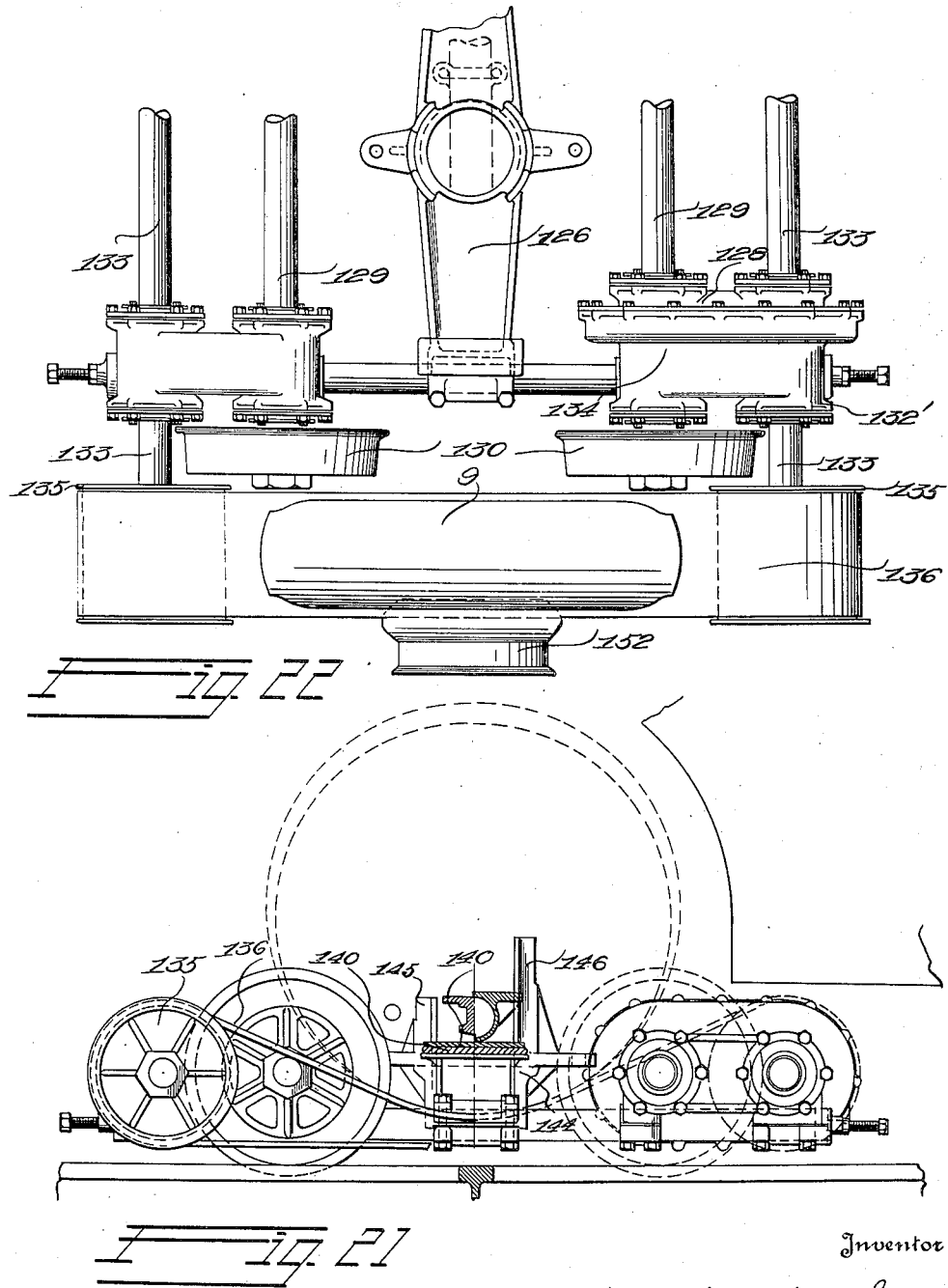

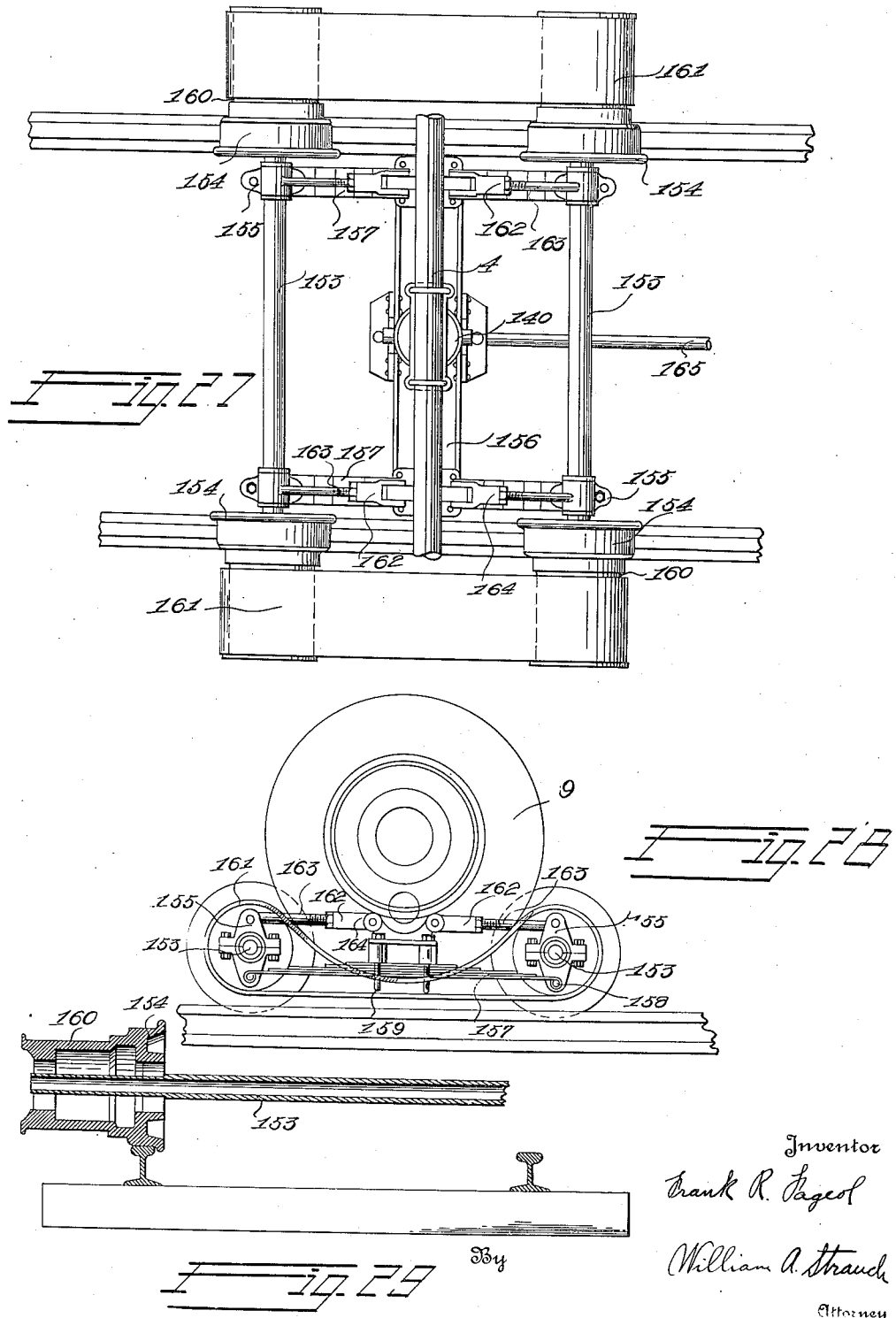

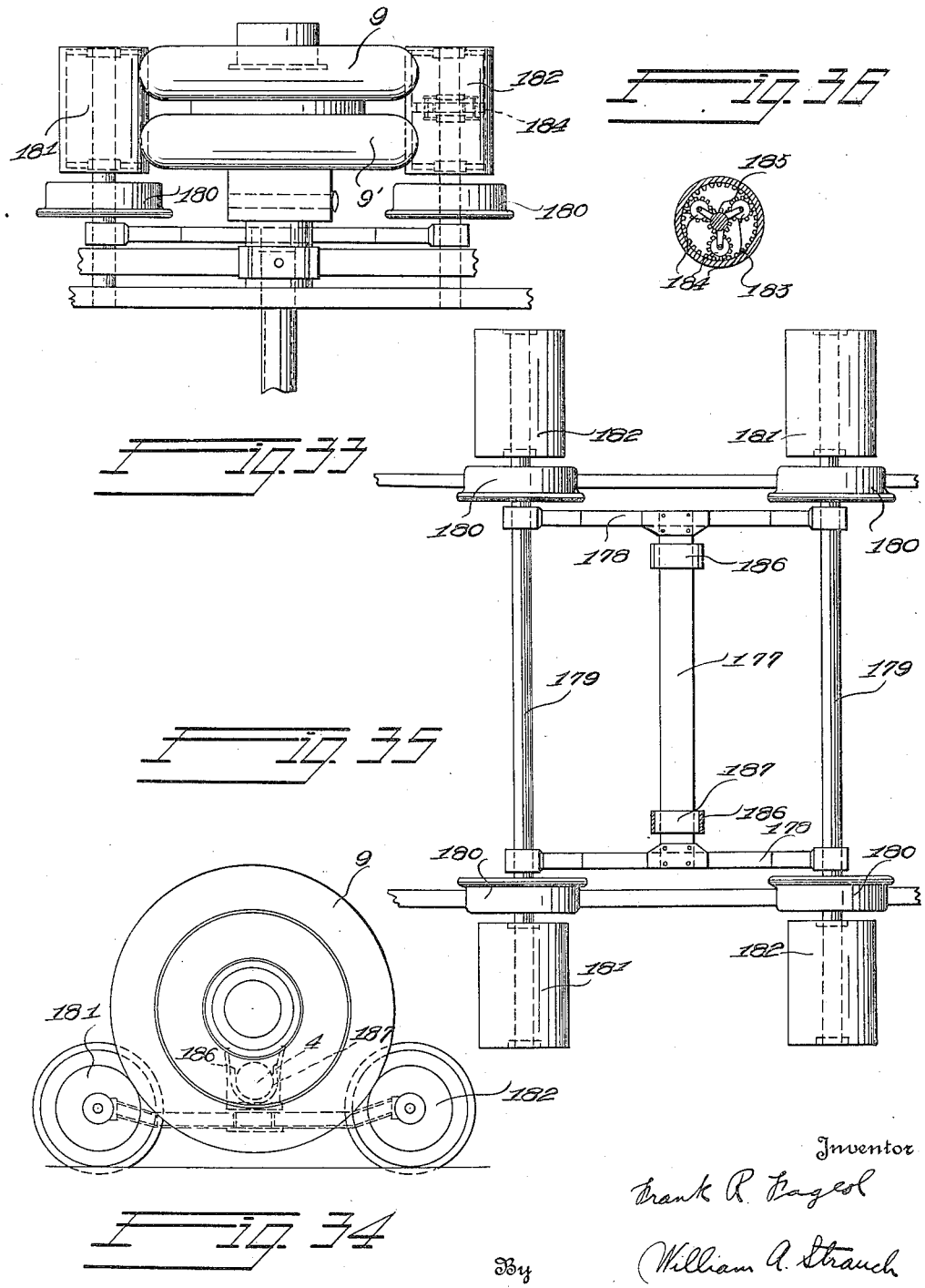

Sept. 27, 1932.   F. R. FAGEOL   1,880,126
RAILWAY ROLLING STOCK AND ROAD VEHICLE CONSTRUCTION
Filed April 19, 1928   15 Sheets-Sheet 14
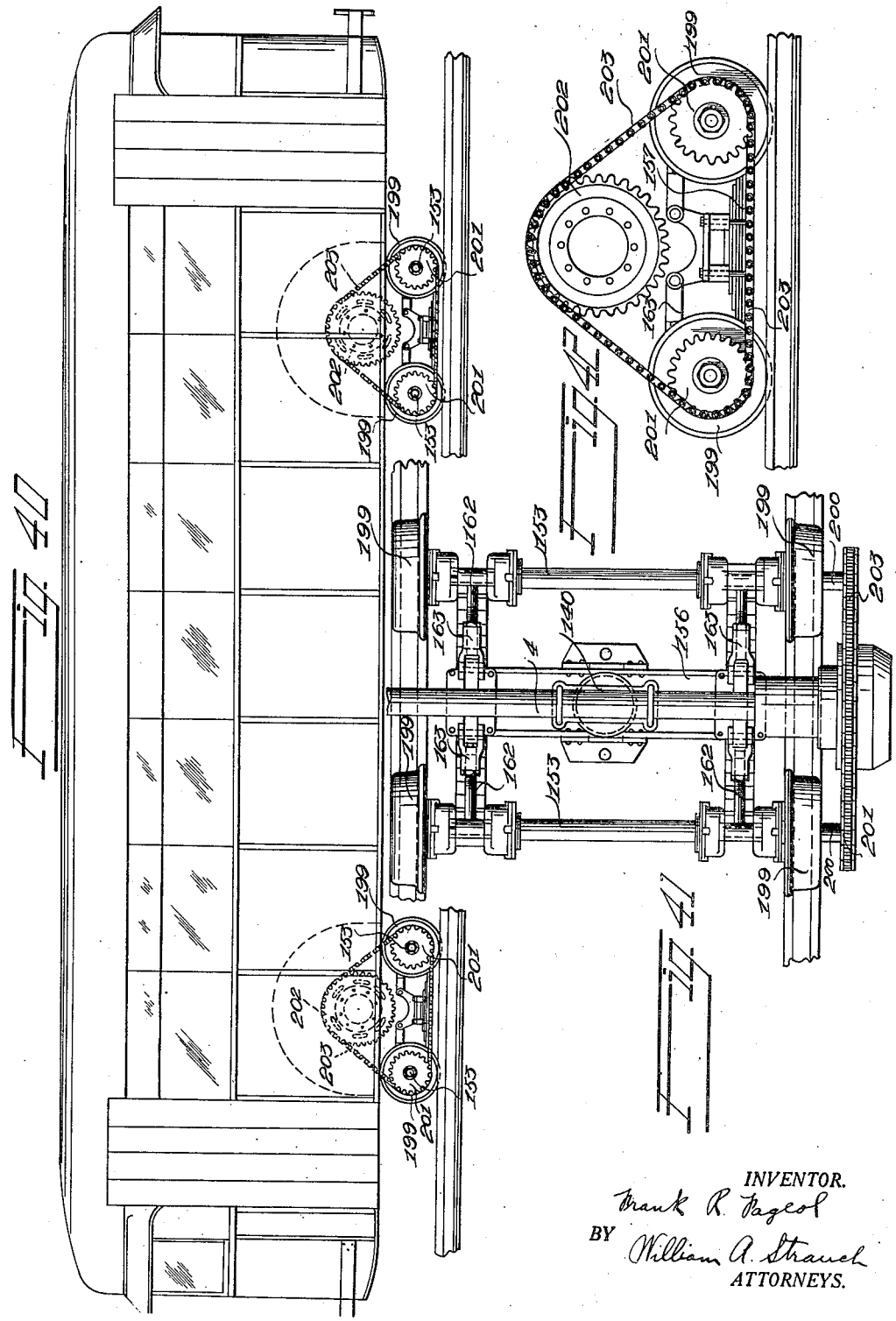
INVENTOR.
Frank R. Fageol
BY William A. Strauch
ATTORNEYS.

Sept. 27, 1932.  F. R. FAGEOL  1,880,126
RAILWAY ROLLING STOCK AND ROAD VEHICLE CONSTRUCTION
Filed April 19, 1928  15 Sheets-Sheet 15
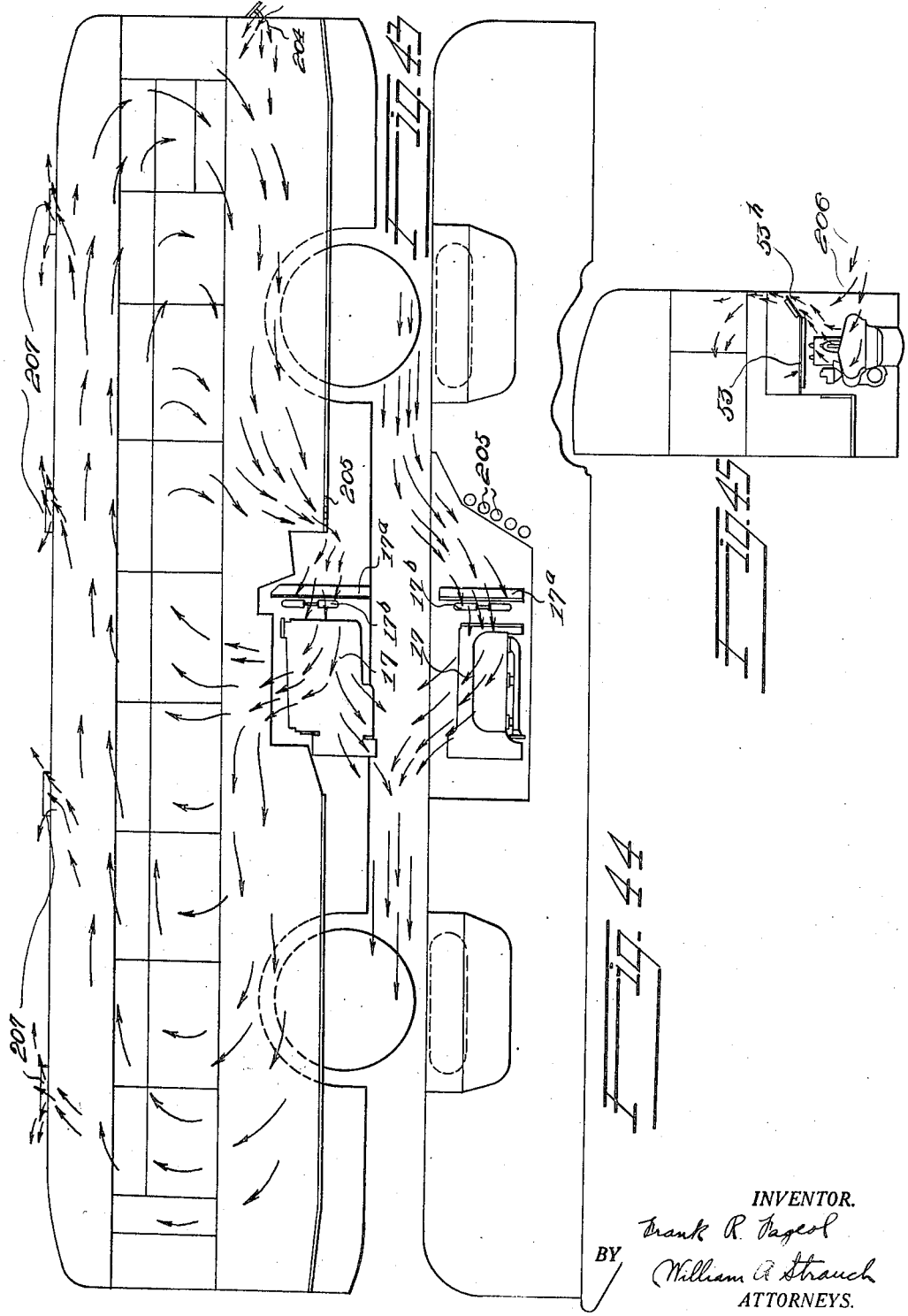
INVENTOR.
Frank R. Fageol
BY William A. Strauch
ATTORNEYS.

Patented Sept. 27, 1932

1,880,126

UNITED STATES PATENT OFFICE

FRANK R. FAGEOL, OF OAKLAND, CALIFORNIA, ASSIGNOR TO TWIN COACH COMPANY, OF KENT, OHIO, A CORPORATION OF DELAWARE

RAILWAY ROLLING STOCK AND ROAD VEHICLE CONSTRUCTION

Application filed April 19, 1928. Serial No. 271,301.

This invention relates to railway rolling stock and road vehicles and is concerned more particularly with an improved rail car and road vehicle having the self contained power unit thereof operatively connected to rail guided wheels.

The primary object of the invention is to provide a rail car which can be very readily converted from a car especially adapted for operation upon rails to a self propelled vehicle that can be used with equal facility as a road vehicle or vice versa.

Another object of the invention is to provide a rail car utilizing all of the structural features of a road vehicle when it is operated upon rails to the end that the riding qualities of a road vehicle may be preserved in the rail car and so that the driving mechanism and the braking mechanism especially adapted for effective use in the propulsion and control of a road vehicle may be just as effectively used in the propulsion and control of the rail car.

A further object of the invention is to provide rail cars and road vehicles in which the power unit or units are supported upon a body constructed of relatively light structural material and in which the power units are so arranged as to provide a construction in which the dead weight of the body and power units is balanced with respect to the rail driving and supporting elements.

A still further object of the invention is to provide rail cars and road vehicles in which the power units are so disposed as to provide a maximum of passenger or load carrying space within the body and in which the power units are so disposed that they are readily accessible for adjustments or repairs and in which the power units may as readily be removed when necessary.

Still another object of the invention is to provide a rail car and road vehicle having a pair of self contained power units supported centrally within the body of the car and widely spaced apart laterally to provide an uninterrupted aisle extending from end to end of the car body.

Another important feature of this invention is the provision of a rail car that may be readily converted into a road vehicle by such simple change of construction as is involved in the omission of the trucks upon which the road vehicle was mounted in order to convert it into a thoroughly practical and efficient road vehicle.

Still another object of the invention is to provide removable trucks for a road vehicle of novel construction that effectively converts the road vehicle into a rail car.

A further object of the invention is to provide a rail car that embodies detachable trucks the wheels of which are driven by the wheels of the road vehicle forming the body of the rail car.

A still further object of the invention is to provide a novel system of heating and ventilating a car body which system utilizes the centrally disposed internal combustion engines to serve the heating and ventilating functions.

Other objects of the invention will appear as the description proceeds with reference to the accompanying drawings, in which, Figure 1 is a side elevation of one form of the improved rail car.

Figure 2 is a sectional view showing the arrangement of seats with respect to the power units and the wheel housings.

Figure 3 is a plan view of the vehicle with the floor removed showing the disposition of the power units and the power unit control mechanism with respect to the driving mechanism.

Figure 4 is a fragmentary plan view of the gas-electric power plant that may be used in place of the power plant shown in Figure 3.

Figure 5 is an end view partly in section, of the improved vehicle.

Figure 5a is a fragmentary plan view showing an improved arrangement for carrying the spare tires or wheels.

Figure 5b is an end view of the bumpers shown in Figure 5a.

Figure 5c is a section on the line x—x in Figure 5a looking in the direction of the arrows.

Figure 6 is a side view of the vehicle with the removable panels that house one of the power units removed.

Figure 6a is a side view of a modified construction whereby the power units may be readily removed.

Figure 7 is a detailed sectional view taken on the line 7—7 of Figure 6.

Figure 8 is a sectional view taken on the line 8—8 of Figure 7.

Figure 9 is a vertical sectional view taken on the line 9—9 of Figure 10 and showing a preferred form of braking and driving mechanism for the driven wheels.

Figure 10 is a fragmentary transverse section through one of the rear axles showing the construction whereby the driven wheels and their separate driving mechanisms may be removed as a unit.

Figure 11 is a sectional view taken on the line 11—11 of Figure 10.

Figure 12 is a fragmentary transverse section showing a preferred form of construction of the body.

Figures 13 and 13a show in plan and side elevation an outline of the modified form of body and frame construction.

Figure 14 is a fragmentary longitudinal section of a form of variable speed transmission that may be used with a power plant of the internal combustion type.

Figure 15 is a view taken transversely of the vehicle and showing the mechanism for synchronizing the movements of the several transmissions and controls for operating them.

Figure 16 is a detailed perspective view showing one form of operating the transmission and control mechanism.

Figure 17 is a detailed sectional view showing an arrangement for conveniently disconnecting one of the power units from a driving wheel.

Figures 20, 21 and 22 are a transverse view partly in section, a side elevation partly in section, and a plan view of a slightly modified form of truck construction.

Figure 23 is a side elevation of an arrangement whereby the attachment of the trucks to the axles of the road vehicle may be facilitated.

Figure 24 is a diagrammatic view showing the manner of assembling the trucks and the road vehicle.

Figure 25 is a transverse sectional view of the arrangement illustrated in Figure 23.

Figure 26 is a detailed plan view of an end portion of one of the tracks used in the construction shown in Figure 23.

Figures 27 and 28 are respectively, a fragmentary plan view, and a fragmentary side elevation of a further modified form of truck for application to a road vehicle especially adapted for use in connection with vehicles embodying a combination of internal combustion engines and electric motors.

Figure 29 is a sectional view of one of the combined rail wheels and drums used in the construction shown in Figures 27 and 28.

Figure 30 is a diagrammatic side view illustrating the use of this invention in connection with road vehicles having a plurality of driven axles disposed adjacent one end of the vehicle.

Figure 31 is a diagrammatic side elevation of a further modification of the invention whereby the road vehicle is converted into a rail car.

Figure 32 is a plan view of a detail showing a rubber kingpin construction.

Figures 33, 34 and 35 are fragmentary views showing a further modification for driving the rail trucks from the road wheels.

Figure 36 is a detailed view showing the planetary gearing used to secure the proper direction of rotation of the truck wheels.

Figures 37, 38 and 39 are further fragmentary plan and elevational views showing a still further modification of the arrangement for driving the truck wheels from the road wheels.

Figure 40 is a side elevation of a further modification of the invention in which sprocket wheels and chains are used to drive the truck wheels.

Figure 41 is a fragmentary plan view of one of the trucks shown in Figure 40.

Figure 42 is a view showing on a larger scale the sprocket chain drive.

Figures 43, 44 and 45 are respectively a fragmentary elevation plan and transverse sectional views showing the heating and ventilating system that may be employed in connection with power units disposed as shown in this application.

Figure 18:
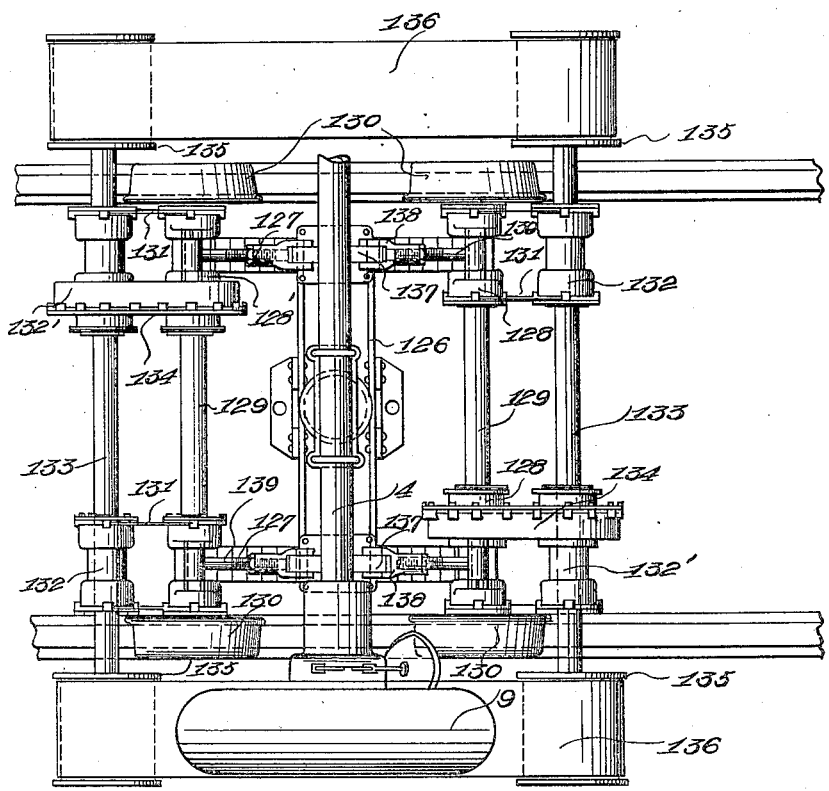
Figure 18 is a fragmentary view of the truck construction shown in assembled relation in Figure 1, a portion of the axle and one of the road wheels being shown.

The invention will be hereinafter described as applied to a vehicle for the conveyance of passengers intended to perform the same functions as standard types of automobile stages or busses operating on roads and at the same time fulfill the additional function of serving as a rail car by making relatively few and simple additions to the automotive bus. Considered as a road vehicle alone, the vehicle of this invention differs from the conventional type of road vehicle propelled by self contained power generating unit, such as an internal combustion engine or gas-electric combination, in that in place of an engine or power unit located within the frame adjacent to the forward end thereof, and in advance of the body, the power mechanism is located substantially midway between the ends of the frame. Preferably a pair of independent motors or power units arranged adjacent each side of the vehicle and widely spaced apart laterally, so that the drive shaft of each motor will align approximately with one of the traction wheels. This invention also contemplates the connection of the separate motors independently with the several driven wheels and the provision of means whereby the motors may be caused to operate in synchronism or separately as desired.

By locating the power mechanism between the front and rear axles and by equipping the vehicle with driving motors disposed as just described, there results an even distribution of weight throughout the vehicle which produces a better balanced structure when the vehicle is loaded or unloaded. The material entering into the construction of the vehicle may therefore be lighter in weight thus reducing the gross dead weight of the vehicle below that of the conventional type of road vehicle having an equivalent passenger carrying capacity. The arrangement of the motors at the sides of the vehicle also permits free access to the motors in order to repair or replace parts and permits the entire removal of the engine without necessitating the dismantling of the vehicle.

This invention also contemplates the use of short axle drive shafts that are not interconnected by the usual heavy rear axle construction embodying differentials. By utilizing such short axle sections and by disposing the power units adjacent the sides of the vehicle body and approximately in alignment with the wheels mounted on said short shafts, a relatively light and compact construction is provided that permits each of the rear wheels to be driven independently by the power unit connected thereto. By using two motors as above described the exhaust gases can be more efficiently muffled and can be made to give off less unburned obnoxious gases during the operation.

It should be understood however, that in relatively light rail and road vehicles, a single power unit may be used located between the axles and at one side of the frame so that ready access may be had to the motor from that side, power from said single motor being communicated to the rear driven road or truck wheels by means of the well known differential such as is ordinarily used.

Furthermore, by locating the power units at the sides of the vehicle in widely spaced apart relation, they will be positioned adjacent the side walls of the body and can be housed beneath a seat or seats as shown in Figures 2, 3 and 7. Such arrangement is particularly advantageous in producing a construction having a low center of gravity with the resulting stability, the arrangement of the engines in such low position that they may be housed beneath the seats contributing greatly toward this result. At the same time this arrangement does not restrict the seating capacity of the body of the car because the engines, being arranged beneath the seats occupy space which ordinarily cannot be used.

By positioning the power units at the sides of the body in widely spaced relation, the flooring of the body can be continued without interruption substantially from end to end of the vehicle, providing a thoroughly satisfactory aisle by which the seats arranged at the sides of the body may be reached. A body having power units disposed as just described having an over all length of 31 feet, 6 inches, has a seating capacity of from 40 to 42 and a total passenger carrying capacity of 80, while a road vehicle of ordinary construction of the same over all length has a seating capacity of 28 or 30 and a total standing capacity of about 60.

A vehicle having a body and power units, arranged as just described is provided with transmission mechanisms, controls, brakes and running gear that adapt the vehicle for operation as a road vehicle. By providing trucks that may readily be attached to the road vehicle in such manner that the brakes and driving mechanism of the road vehicle may be utilized, a thoroughly effective rail car is produced that is capable of being converted into a road vehicle by removing the trucks. In the embodiments of the invention disclosed in this application, the trucks are attached to the road vehicle in a simple manner, thus readily producing a rail car having the necessary traction for operation upon rails and that can be operated on tracks of necesary gauge and controlled in precisely the same way and by the identical mechanisms that are used when the trucks are removed and the vehicle is operated as a road vehicle. A rail car is thus provided that can be operated on rails between towns and that can readily be converted into a road vehicle of novel construction, and used as such to collect passengers or freight at points within the towns that are removed some distance from the rails.

In detail, the construction illustrated in the drawings comprises the frame of a combined road and rail vehicle consisting of a pair of spaced parallel channels 1 and 2 extending the length of the vehicle and joined at intervals by transverse stiffening bars 3. The parallel bars may be made much lighter than the usual chassis members of road vehicles. In the present construction they may be 6 inches deep at the middle of the frame, while in the ordinary road vehicle they are ordinarily nine or ten inches in depth. An axle 4 is arranged beneath the frame adjacent the rear end thereof, and the opposite ends of said axle are connected by interchangeable leaf springs 5 to opposite sides of the frame. The flexible connection between the frame and axle 4 is similar to that ordinarily used in road vehicles and such connection is used in the embodiment of this invention to resiliently support the body from the trucks that engage the rails, thus producing a rail car having the same easy riding qualities that characterize the road vehicle.

In the preferred form of my invention in which two independent power units are used, the opposite outer ends of the axle 4 are each provided with a housing 7, fixedly secured thereon, in which a shaft 8 (Fig. 5) is rotatably mounted. The outer end of each shaft 8 has a road traction wheel 9, fixedly secured thereon. The road traction wheels 9 are driving wheels which are rotated by power units on the vehicle, through the medium of a driving mechanism in the housing 7 which is located between the springs and the driving wheels 9, to move the vehicle in either a forward or reverse direction, in a manner to be hereinafter explained. As shown in Figure 2, the forward end of the vehicle frame is likewise provided with an axle 4a suspended therefrom, and on the outer ends of which the usual type of front road wheels provided with brakes, if desired, are mounted. This axle may desirably be located, as shown, approximately the same distance from the front end of the vehicle as the rear axle is from the rear end.

A flooring 10 is arranged across the upper face of the frame members 1 and 2 on wooden sills 6. The flooring projects beyond the outer sides of the frame members, whereby the opposite side edges of said flooring will lie substantially parallel to the frame members 1 and 2. The flooring 10 forms a part of the body 11 that is superimposed on the frame members, and the flooring and body together may extend the entire overall length of the vehicle. The body 11 is provided with side and end walls 12, and an enclosing top 13, which, in conjunction with the flooring 10, forms a complete housing to hold and seat passengers to be transported by the vehicle. The side walls 12 of the vehicle body are secured to the projecting side edges of the flooring 10, whereby, as shown in Figure 12, said side walls 12, overhang and extend below the level of the flooring 10. The sides 12 of the body are arranged in spaced parallel alignment with the frame members 1 and 2. The side walls 12 of the body are secured by lateral cross bars 14 to the frame members 1 and 2 and the interior of the outer walls 12 of the vehicle body. The side walls 12 of the body are provided at their lower edges with angle bar stiffeners 15 thereon, each of which is joined to the transverse bars 14 and 14a to give the necessary rigidity and support to the interconnected body and frame. Angle plates 15a are also provided to give additional bracing and stiffening effect between the members 2, 12, 14 and 14a. The side and front walls of the body and the roof are preferably made of sheet metal stiffened at intervals with horizontal braces 12a and vertical braces 12b of angle iron or other suitable construction. By the use of a suitable stiffened body floor extending the overall length of the vehicle and properly balanced with respect to the front and rear axles as above described, and in part by the use in construction therewith of a body extending the full length of the vehicle and properly balanced as above set forth with respect to the front and rear axles and having side walls and roof portion suitably stiffened as above described, it becomes unnecessary to employ the usual separate heavy chassis construction upon which the bodies of automotive road busses are ordinarily mounted; and in place thereof there can be used the relatively light frame longitudinal members above described to which the transverse floor supports and flooring and the side walls of the body are attached in my construction as above set forth.

A further means for stiffening the body and frame members is provided by the road wheel housings 12d which are formed as shown in Figures 1, 5 and 10. The edges of the side members 12 of the body are provided with a flange to which the housing 12d is secured as shown in Figure 5. The housing then curves inward and downward to meet the axle 4 between the driving gear housing 7 and the springs 5. The floor 10 is secured to the housing 12d by an angle bracket 10a which is bolted thereto. The floor 10 is thus pressed against the side 12 of the body by the housing 12d which also provides a support for the seat 53a of which the riser is shown in Figure 10. These housings form braces at four points in the body as shown in Figure 2 and thereby add to its rigidity.

By using a properly stiffened and balanced floor and where a body is used thereon by suitably stiffening the same and properly balancing it with respect to the axles and thus materially reducing localized strain and stress, it is possible as illustrated in Figures 13 and 13a to still further reduce the weight of the frame construction by eliminating the continuous frame members 1 and 2 and substituting a series of short transverse members mounted on the front and rear springs and connected with the side members of the floor or of the walls of the body and a series of short longitudinal members extending between the transverse and longitudinal members all being relatively light as compared with the usual chassis sills or with the frame members 1 and 2 of Figure 3. In Figures 13 and 13a, 4 and 4a are the axles upon which are mounted the springs 5—5 upon which are mounted the transverse members 14a—14a. The outer ends of these transverse members are connected with the outer edge members 15a of the floor or side wall of the vehicle. If desired, one or more other transverse members 14d may be used to extend between opposite points of the member 15a and to support the floor and short longitudinal supporting members 1a and 2a. The members 14d may be used to support the engines 16 and 17. Where the floor and the body are suitably stiffened and properly balanced as above set forth, they are capable of supporting a large part of their gross weight and that of the load and the frame construction may therefore be made correspondingly lighter. It should be understood, however, that many important features of my invention may be used in conjunction with the usual chassis and body construction or with any other known form of rail car body construction.

As clearly shown in Figure 2 seats are provided within the car body preferably arranged as shown in this figure in which the seats disposed over the wheel housings and over the power units are arranged longitudinally of the car while the seats disposed at other points within the car body are arranged transversely of the car body all of said seats however being so arranged as to provide an uninterrupted aisle extending from end to end of the car body. Preferably a baggage rack in continuous or other form extends from end to end of the car body at each side thereof above the seats as shown in Figure 5. Said rack is supported on a plurality of spaced brackets secured at 12e to the side wall of the body at one end and at the other end to the brackets 13a suspended from the roof 13. Suitable metallic or other baggage supporting material 12f extends outwardly from the side walls and rests upon the members 13f. By disposing the baggage racks as just described, the space within the body is further conserved in that a suitable space is provided for the baggage of the passengers so that said baggage does not encroach upon the space needed in entering and leaving the vehicle.

Between the inside face of the overhanging side walls 12 of the body 11, and the outside face of each of the frame members 1 and 2, in the form of my invention shown in Figures 1-12 inclusive, a space is provided in which I mount the power units for rotating the road traction wheels 9. The motors 16 and 17 are mounted at corresponding points on opposite sides of the outside of the frame. The motors are preferably internal combustion engines, although it would be clearly within the purview of the invention to utilize some other type of self-contained power generator, as, for example, a combined gas-electric unit as shown in Figure 4. In this figure the numerals 16, 16a, 16b, 16c, and 16d, denote the gasoline engine, generator, electric motor, clutch, and rheostat control respectively.

One side of an end of each motor is secured in a bracket 18 mounted on the exterior face of each of the channels 1 and 2, respectively, of the frame, and the other side of the same end of each motor is mounted in a bracket 19, that is secured to one of the angle stiffeners 15 on the side wall 12 of the body. The motor supporting brackets 18 and 19 may be padded with some suitable resilient material to provide a cushion mounting for the motor. The forward end of each motor is supported in a bracket 20 that is secured to one of the transverse supports 14 extending across the space between the outside of the chassis and the side wall of the body.

If desired, the members 15 may be made in sections 15a and 15b (Figure 6a) secured together in overlapped relation by removable fasteners 15c, in order that the section 15a may be removed to facilitate removal of the motor 17. Similarly, the member 12b may be provided with a separable section 12c secured in overlapped relation by removable fasteners 12d to member 12b so that section 12c which is rigidly secured to detachable section 15a at 12d may be removed as a unit therewith. The motor 17 may be removed with facility after the sections just referred to have been detached.

In front of the forward end of each engine, a radiator, 17a, and cooling fan, 17b, are arranged. If desired, the fan may be utilized to direct a current of warm air from the engine upwardly into the interior of the vehicle body to warm the air therein, as will be described below. A shaft 21 is connected to the forward end of the engine crank shaft and extends therefrom in axial alignment. The shaft 21 of one of the engines is connected by a flexible coupling 22 to the generator 23, to charge the storage batteries which supply the electricity for lighting the interior of the vehicle body and for starting the engine. An air compressor 24 is connected to the shaft 21 of the other engine by a similar coupling 22, to generate air pressure to be used in operating the brakes of the vehicle.

The rear end of each of the motors 16 and 17 is provided with a change speed gearing or transmission thereon, indicated by the numeral 25. A driven shaft 26 extends from the transmission 25 and is connected by a propeller shaft 27, operating through suitable universal joints 28, to a worm driving shaft 29a that is rotatably mounted in the housing 7 on each of the opposite ends of the rear axle 4. A gasoline tank 17c is mounted between the frame member 1 and 2 below the level of floor 10 and is suitably connected to the motors 16 and 17. A filling pipe 17d leads from a point in the side members 12 of the body to the tank to facilitate filling.

The traction road wheels 9 are secured to the tubular axle 4 in the manner shown in Figure 10. The housing 7 is secured to the extreme end of axle 4 by a plurality of bolts 7a which permit the removal of the wheel and driving gear as a unit without disturbing the axle and springs. The shaft 8 that is rotatively journaled in the housing 7 and on which the traction wheel 9 is secured rotates in the housing 7 in substantially the same vertical plane as the axle 4. The shaft 8 is supported in the housing 7 by the anti-friction bearings 30 and 31, respectively. A worm wheel 32 is fixed on the shaft 8 within the interior of the housing 7 to mesh with the worm 29 that is connected by shaft 27 to the driving engine. Each traction road wheel 9 is provided with a center hub 33 that engages the projecting end of the shaft 8 and said wheel is held on the shaft by the nut 34.

The felly 35 of the road wheel 9 is arranged concentrically to the axis of the shaft 8. The wheel felly likewise extends over a portion of the housing 7 in which the shaft 8 is mounted. A pneumatic or solid tire 36 is mounted on the felly 35 on the wheel 9. A brake drum 37 is bolted to the inner face of the wheel 9, and said brake drum is arranged substantially concentric to the axis of the shaft 8. The brake drum 37 is practically concealed within the felly 35 of the wheel 9, and said brake drum 37 extends part way over an end of the housing 7 in which the worm and worm wheel are mounted. A pair of curved brake shoes 40 and 41 have a common end thereof pivotally mounted on a pin 42 that is fixed to the bottom of the housing 7. The brake shoes 40 and 41 are adapted to parallel practically the entire inner circumference of the brake drum 37. A bearing 43 is mounted on the casing 7, on the side thereof opposite to that on which the brake shoe pivot pin 42 is mounted. A shaft 44 is rotatably mounted in the bearing 43, and said shaft 44 has a cam 45 on the end thereof which is adapted to lie between the free ends of the brake shoes 40 and 41. The shoes 40 and 41 have the free ends thereof held in contact with the cam 45, by the contractile springs 46 and 47 respectively, each of which have one end thereof connected to one of the brake shoes and the other end thereof secured to the housing 7. Thus the brake shoes are held in contact with the cam 45, and out of contact with the brake drum 37. When the cam 45 is partially rotated, the brake shoes 40 and 41 are moved into frictional contact with the face of the brake drum 37 so that the rotation of the wheel 9 is stopped. This construction of wheel and brake drum permits adjustment of the brake shoes 40 and 41 by the simple means of removing the nut 34 and sliding the wheel 9 from the shaft 8.

An arm 48 is secured to the shaft 44 to effect the desired turning movement of the cam 45 and bring about the application of the brake shoes 40 and 41 to the brake drum. I prefer that the brake shoes 40 and 41 should be operated pneumatically and, to effect this desired operation, I mount a diaphragm casing 50 on the casing 7 in which an expansible diaphragm (not shown) is arranged. The diaphragm connects or contacts with a shaft 51 which is pivotally connected to the arm 48 on the shaft 44. When air pressure is supplied through the conduit 52 to the cylinder 50, the diaphragm within said cylinder is expanded, the shaft 51 is reciprocated, and the shaft 44 is partially rotated to turn the cam 45 and thus move the brake shoes 40 and 41 into contact with the brake drum. The conduit 52 that supplies compressed air to the diaphragm casing 50 is in turn connected to the compressor 24 which is operated by the motor 16.

The spare tires or wheels necessary in the normal operation of the vehicle as a road vehicle may be housed without encroaching upon the available passenger carrying space on the interior of the body and without projecting beyond the outer limits of said body by providing a tire or wheel carrying receptacle adjacent the rear of the vehicle body beneath the floor thereof as shown in Figures 5a, 5b and 5c. As shown in these figures the spare tires are arranged flatwise on shelves 3a and 3b disposed in spaced relation beneath the floor level of the car. In order to hold the spare tires in proper position on said shelves a bumper 15a is provided. As clearly shown in Figure 5a said bumper is made in two sections each section being hinged at 15b to the side of the car body and extending around the end of said body to a point adjacent the central longitudinal line the free ends thereof being curved as shown at 15c to engage the spare tires arranged on said shelves. Preferably the bumper 15a comprises a pair of bumper members disposed at parallel spaced relation and connected by straps 15d the spacing of said bumper members being such that they individually engage the tires arranged on said shelves. In order to secure the bumper sections in proper position with respect to the end of the car body bolts 15e are provided arranged in position to enter apertures in the straps 15d. Suitable wing nuts 15f serve to adjustably swing the bumper sections on their hinges in order that the ends 15c thereof may be brought into firm engagement with the spare tires before referred to. The arrangement just described not only utilizes the bumper sections to hold the spare tires in the tire compartment, but the spare tires themselves contribute to the effectiveness of the bumper in that said tires serve to provide a cushioned support for the free ends of the bumper sections while at the same time the tires themselves serve as bumpers to protect the vehicle body from blows applied to the central rear end thereof.

The engine housing is formed by the seat 53 and the seat riser 53a, and behind the seat back is a header tank 53b, for the radiator with a filling inlet 53c in the side walls of the body. Preferably the seat and riser are lined with heat insulating material 53d. A ventilating and heating system may be used in connection with the engine housing by which the air from the interior of the vehicle can be drawn by the fan 17b through openings 53e in a seat riser and either discharged into the air through the radiator 17a, around the engine and out of the louvers 54a or be diverted by a duct 53f and discharged after being heated by contact with the radiator and by proximity to the engine into the vehicle through other openings 53g in a seat riser, which openings can be closed by a perforated slide 53h, in which event all of the air drawn through the openings 53e will be discharged over the engine into the open air. Due to the fact that the air passing into duct 53f does not pass around the engine, the noxious gases from the engine are not drawn into the bus with the heated air. The gases are taken out through the louvers 54a.

The side walls 12 on the opposite sides of the vehicle body are arranged so that panels 54 therein with louvers 54a may be removed to permit free access to each of the power plants to effect repairs or adjustments thereof. When the covering panels are in position, the motors are concealed from outward view so that it is practically impossible to discern in what part of the vehicle body the driving motors are located.

In the illustrated embodiment of my invention, it will be seen that instead of using a single large internal combustion engine mounted at the forward end of the chassis over or just behind the front axle and mounting on the chassis a body, the forward end of which is at the rear end of the engine, all of which is the common usage in construction of automotive road vehicles of this type, two smaller gas engines are used and are located about midway between the front and rear axles and each at one side of the frame at a point close to the side wall of the body. The frame members that support the body extend the same length as the usual sills of the chassis, but in the present case the body and its flooring are extended the full length of the frame, the forward part of the body occupying the space ordinarily occupied by the engine, thus adding very largely to the available floor or load space of the vehicle, a most important factor in road vehicles of this class. By reducing the size of the internal combustion engines and mounting them at the sides of the body, they can be located under seats and thus neither impede the usual center aisle or in any way interfere with the full utilization for seating purposes of the floor area of the vehicle. By locating the power unit near the center of the vehicle, instead of at the front, the front axle can be moved back along the frame to a point substantially the same distance from the front as the rear axle is from the rear end of the frame. This results, both when the vehicle is empty and when it is loaded, in a substantially even distribution of weight with respect to the axles and a great reduction of stresses upon the frame members which permits of the material lessening of their size and weight above described. The extension of the body to cover whole or substantially the whole of the frame, including the portion extending ahead of the front axles makes possible, by suitable interlocking of the body with the frame members, a substantial participation of the body itself in the load supporting action of the structure, again permitting the use of the lighter frame members. This is in marked contrast with the conventional road bus construction in which the forward end of the body terminates at a point on the frame substantially back of the front axle, and the entire weight at that point is carried by the chassis sills which must be made heavy enough to perform this duty. Another desirable result of the better balancing in my construction of the load both in the empty and in the filled vehicle is that the various vertical, horizontal and twisting stresses to which the frame members and the body are subjected are greatly reduced, the liability to sudden breaking or gradual giving way is lessened, and the life of the vehicle correspondingly increased.

The better balance also tends to lessen the jerky vertical rebounds present in the overhanging rear portions of the usual bus and to impart to the present construction an easier riding motion. The location of the front axle at a distance from the front of the vehicle also permits of the use of longer front springs than in the conventional practice, which adds to the ease of riding.

Another benefit resulting from the shortening of the wheel base due to moving the front axle back along the frame (which in turn is made possible by the locating of the power unit near the center of the automobile) is the greater ease in turning that is thereby imparted to the vehicle when operated upon a road. Another factor adding to the more perfect control of the vehicle is the locating of the driver's seat and steering wheel at the very front of the vehicle where an unobstructed view may be had of conditions immediately ahead and in close proximity to the front of the vehicle, thus enabling the driver to judge distances and avoid accidents to a degree not possible to the ordinary automobile with the engine located in advance of the body.

By locating both the front axle and wheels and the back axle and wheels a considerable distance from their respective ends of the vehicle frames, front and rear doors 12c may be used located respectively in front of the front wheels and behind the rear wheels. This is of decided advantage in the loading and unloading of passengers. To conform to this arrangement, the steering wheel is located ahead of the front axle and the drag link 123 extends rearwardly instead of forwardly as in the conventional practice.

By dividing the power plant into two units, each drive wheel may be independently operated and the usual complicated and easily disarranged differential mechanism may be dispensed with. By driving the rear wheels from power units located near the middle of the frame instead of near the front, the transmission elements or shafts are shorter and less complicated and the stresses to which they are subjected and the resulting wear and tear are materially reduced. The practice of dividing the power units also enables the mounting of the driving gears outside of the frame, thereby facilitating adjustment and repair of the parts, and facilitates the removal of the driven wheels when such removal is required to convert the road vehicle into a rail car. Also due to the dividing of the power units a means has been provided whereby one unit may be disconnected from its respective driving gears in the case of an emergency and the vehicle continues to operate through the medium of the other unit until repairs may be made to the disabled unit.

In Figures 3, 14, 15 and 16 I illustrate a system of controls whereby the engines may be operated together as a unit or separately, as may be desired. As hereinbefore stated, the type of power plant which I have selected as the preferable embodiment of the invention comprises two internal combustion engines, one on each side of the vehicle, each engine being connected to a rear road wheel separately driven. The particular engines which I illustrate are of the vertical reciprocating type, and power is transmitted by each engine to its corresponding drive wheel through a clutch of any conventional type, and speed variation is obtained by a transmission of the selective sliding gear type, which is capable of three speeds forward and one speed in reverse. This system of engine release and speed variation, therefore, necessitates two control systems, one for the clutches and the other for the variable speed transmissions. There is, in addition, a control system for the throttles which will be later referred to. Describing, first, the control system for the variable speed transmission, each engine is provided with a separate mechanism of this character, which may be rights and lefts, or similar as desired. In the figures referred to, the transmissions are similar and, therefore, it is necessary to describe in detail only one of them, except insofar as may be necessary to clearly explain the operation of the controls with respect to both. A suitable gear box is provided and, into this box, extends the usual shaft 55 carrying the gear 56. The gear 56 is in constant mesh with the gear 57, which is mounted on the countershaft 58 carrying fixedly mounted thereupon the first or low speed gear 59, the second or intermediate speed gear 60, and the reverse gear 61, which is in constant mesh with the reverse pinion 62 fixedly mounted on the shaft 63. The splined shaft 64 has a bearing in the shaft 55 and also at 65 in a wall of the gear box. The splined shaft 64 carries the sliding gear 66 provided with the teeth 67, which are adapted to engage with the teeth 68 for third or high speed. The gear 66 may be caused to slide back and forth along the splined shaft 64 and thus cause the teeth 67 to mesh with the teeth 68 or to cause the gear itself to mesh with the gear 60. A convenient means of securing this sliding motion may consist of the slidably mounted rod 69 carrying the yoke 70, which rotatably engages a groove located at the side of the gear 66. In a similar fashion, the gear 71 is mounted on the splined shaft, and this may be caused to slide forward and engage with the gear 59 for low or first speed or rearwardly to engage the pinion 62 for reverse, as may be desired. The means for sliding this gear are similar to the means for sliding the gear 66; that is to say, a yoke 72 is carried by the slidably mounted rod 73, and this yoke engages with a groove at the side of the gear 71 in the same manner as in the case of the gear 66.

Each of the slide rods 69 and 73 is provided with suitable means to permit engagement therewith by the shift finger 74, such means consisting of the transverse groove or slot 75 in the slide rod 69, and a similar slot or groove in the slide rod 73. These slots or grooves are so positioned with respect to each other that, when the gears 66 and 71 and the teeth 67 are wholly disengaged from the gears and teeth with which they are intended to mesh; that is to say, when they are in neutral position, the slots or grooves are in registry, or in other words, in transverse alignment with each other so that the finger 74 may be readily caused to slide from one to the other for operating which ever one of the slide rods that may be selected. The variable speed mechanism thus far described is of a conventional design and is selected for illustration merely for that reason. It is to be understood, however, that the invention is not confined to any particular type of variable speed mechanism.

To operate the variable speed mechanism, it is, therefore, necessary to cause the finger 74 and also a corresponding finger in the opposite gear box 77 to move transversely with respect to the slide rods 69 and 73, when the grooves in these rods are in alignment, and also to have a forward and rearward motion when in each groove, to bring about the desired gear connections. The forward and rearward motion of the fingers is in my preferable embodiment of the invention secured by rotation of the fingers. The desired motion of the fingers is attained by imparting a sliding motion and a rotary motion to the shafts 78 on which the fingers 74 are mounted. In the mounting of these fingers, I have provided for a locking mechanism for normally preventing them from rotating on the shaft, which will be later described. For the present, it may be assumed that these fingers are rigidly connected with the shafts 78.

The shafts 78, which are mounted as shown in Fig. 15 on the gear box, together with the shaft 79 virtually constitute a unit shaft but, in order to make allowance for misalignment of bearings due to weaving of the frame and other causes of distortion, I interpose universal joints at convenient places, which joints may be of any suitable design, such as that shown; that is to say, the adjacent ends of each shaft may be provided with spiders 80 and 81, which engage the fabric disc 82, this joint permitting considerable misalignment of the shaft sections and also causing all of the sections to rotate and slide with each other, when motion is imparted to one of them.

For imparting rotary and sliding motion to the shaft 79 and, hence, to the fingers 74, I fixedly mount on the shaft 79 a finger or lever 83 having, as shown, universal joint connection with the rod 84, which is slidably carried in the tubular elbow 85. The tubular elbow 85 is fixedly mounted on the rod 86 which, in turn, is slidably and rotatably mounted in the tube 87, suitably fastened to a fixed portion of the vehicle. The opposite end of the rod 86 carries another tubular elbow 88 in the bore of which operates the ball 89 of the shift lever or "wobble stick" 90. The shift lever is mounted for universal oscillation by means of the ball 91 seated in a socket in the usual manner. By swinging the arm 92 of the shift lever transversely of the vehicle, the fingers 74 are given a transverse movement for selecting the particular one of the slide rods 69 and 73 that may be desired and then by swinging the shift lever backwards or forwards, the particular gear connection desired may be established.

It is frequently necessary or desirable to disconnect one engine entirely from its corresponding drive wheel. To accomplish this purpose, I provide the arrangement shown in detail in Figure 17. The fingers 74 are mounted on the shafts 78, so that the fingers are rotatable but are prevented, by the screws 93 operating in the grooves 94, from moving longitudinally of the shaft. The fingers 74, however, are normally locked against rotation on the shafts 78 by means of the locking member 95, which has teeth 96 adapted to engage with teeth 97 on the fingers. The locking member 95 is provided with a key 98, which is adapted to travel in the groove 99 and is also provided with a threaded stem 100. The threaded stem engages with a nontraversing nut 101 and, as the nut is turned in either direction, it is prevented from traveling by its head 102 or the flange 103, according to the direction of rotation. By turning the nut to the right, assuming that the thread is right-handed, the locking member 95 is withdrawn from engagement with the fingers 74 and, if the fingers 74 be in neutral position when this is done, further rotation of the shafts 78 causes no rotation of the fingers 74, and, therefore, one or both engines may be wholly disconnected from their corresponding drive wheels.

The particular type of clutch that may be used is not of importance, so far as the scope of the invention is concerned. The details of the clutches are not shown, but it may be assumed that they are to be operated by rotation of the shafts 104 and 105 and that they are normally held in clutching engagement by yielding means in the conventional manner. Each of the shafts 104 and 105 is provided with a lever arm 106 and 107. A cross shaft 108, mounted in bearings depending from any fixed portion of the vehicle, is provided with lever arms 109, the ends 110 of which are provided with adjusting screws 111, which normally merely contact with the lever arms 106 and 107, or there may be slight clearance, if desired. Obviously, when the shaft 108 is rotated in a direction to cause the set screws to bear against the lever arms 106 and 107, rotation of the shafts 104 and 105 will take place and declutching will result.

Rotation of the shaft 108 may be effected by means of the lever arm 112 and rod 113, which is operated by a suitable train of levers not shown in detail, leading from the clutch pedal 114.

The throttle control is best illustrated in Figure 3, and the arrangement is such that the throttles may be operated separately, or both together, or differentially as may be desired. From each of the throttles 115, there leads a lever train comprising the link 116, the lever arm 117, the cross shaft 118, the lever arm 119, the pull rod 120, the lever arm 121, the cross shaft 122, the link 123, and the pedal 124. The lever trains for the throttles are alike, and the pedals are placed side by side so that their combined transverse dimension would be about that of the width of the shoe of the operator. The operator may, therefore, press both pedals at once, or each one separately, by tipping his foot to the right or left, as required, thereby securing a differential opening of the two throttles.

The structure so far described constitutes a road vehicle of novel construction, but of a type that is especially well adapted, so far as the body thereof is concerned, for conversion into a rail car since the body presents all of the characteristics of a thoroughly practical and efficient rail car in that an uninterrupted aisle is provided from end to end of the body with doors at both ends thereof. Said body also has a maximum passenger carrying capacity for its weight and length and presents a balanced construction that lends itself readily to high speed operation on rails. The vehicle may be operated as a road vehicle when desired but may be readily converted into a rail car by the addition thereto of trucks, constructed as presently described, that may be readily attached to the road vehicle to effect the conversion. Said trucks support the weight of the vehicle and are operated and controlled by the road wheels or by the shafts that carry said wheels when the vehicle is used as a road vehicle. By so operating and controlling the trucks, the operating and control mechanism of the road vehicle may be used without any change whatever in the operation and control of the rail car.

Figure 19:
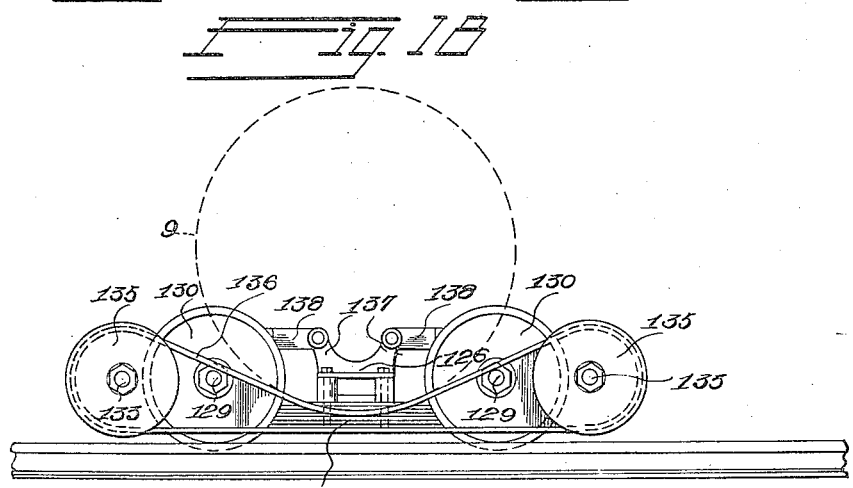
Figure 19 is a side elevation of the parts as shown in Figure 18.

The preferred embodiment of the invention whereby the above described road vehicle may be converted into a rail car, contemplates the addition of trucks 125 beneath each of the axles said trucks sustaining the entire weight of the road vehicle including the road wheels. Each truck 125 may be constructed, as shown best in Figures 18 and 19 and comprises a transverse frame member 126 and a pair of spaced connecting members 127, shown in the form of springs in these figures. Said springs are connected at their ends to a pair of housings 128 and 128'. Journaled in said housings are the truck axles 129, having secured thereto the flanged rail wheels 130 of conventional form.

Connected in spaced relation to housings 128 and 128' by suitable brackets 131 are housings 132 and 132', said housings being provided with suitable bearings for truck driving shafts 133 rotatably mounted therein. Housings 128' and 132' are preferably connected together by an integrally formed gear housing 134 formed to receive spur gears (not shown) secured to the axles 129 and shafts 133 and meshing with each other so that the rotation of shaft 133 will be communicated to axles 129. In order to drive shafts 133, each of said shafts is provided with a pulley 135 fixed to each end thereof. Wide endless belts 136 are passed around the pulleys 135 at the same side of the vehicle.

In order to adjustably space the housings 128 and 128' and the shafts carried thereby, apart, the transverse member 126 is provided with ears 137 pivotally connected to members 138 adjustably united to arms 139 projecting toward each other from adjacent housings at the same side of the truck. Adjustment of arms 139 relative to members 138 serves to effect adjustment of the tension of the belts 136.

Trucks constructed as just described are detachably secured to the axles 4 of the road vehicle by attaching to each axle trunnion members 140 by means of clips 141 and nuts 142 (Figures 5, 20). Trunnion member 140 has a depending annular flange 143 constituting a trunnion socket for engagement with a suitably formed trunnion member 144 in transverse member 126. Preferably, member 144 is provided with upwardly projecting pairs of spaced arms 145 and 146 (Figs. 5 and 21) of varying length designed to receive the member 140 between them, said pairs of arms being spaced apart just sufficient to snugly receive said member and guide member 140 in proper position over trunnion 144. Arms 146 are longer than arms 145 to facilitate the attachment of members 140 to the axles, the longer arms constituting stops for the axle when the road vehicle is driven over the trucks that may be arranged so that the road vehicle can be driven thereover until the axles abut against the arms 146, in a manner such as will presently be described.

One very simple and effective way of accomplishing the ready connection and disconnection of the trucks 125 and the axles to convert the road vehicle into a rail car and vice versa, is illustrated in Figs. 23, 24, 25 and 26.

In these figures, the spaced tracks 147 are arranged at opposite sides of rails 148 upon which the trucks 125 are guided. The tracks 147 are supported on suitable supporting members 149 in order to space said tracks substantially above the rails 148. As clearly shown in Figure 23, the ends of tracks 147 are inclined downwardly at both ends toward the ground, as shown at 150. In general, the tracks 147 are parallel except at their extreme ends where said tracks are flared outwardly at 151 (Fig. 26) for a purpose presently to be described.

In order to utilize the spaced tracks as just described in effecting the connection or disconnection of the trucks with the axles, the wheels 9 of the vehicle are provided with drums 152 (Figs. 10, 30 and 22) projecting outwardly from the hub sections 33. As clearly shown in the figures just referred to, the drums extend substantially beyond the hub caps and beyond the tires on the road wheels. The tracks 147 are spaced apart a distance sufficient to permit the road wheels to enter therebetween, but the spacing of said tracks is so arranged that the drums 152 projecting from the wheels will engage said tracks. When said drums engage the inclined portions 150 of the tracks 147 the road wheels are bodily lifted from the ground, and as the drums are rigidly secured to the wheels, the operation of the wheels causes the drums to move upwardly on to the straight portion of the tracks 147. Said portions are made sufficiently high in order that the trucks 125 can be bodily arranged beneath the axles as shown in Figure 24. The members 140 clear the upper ends of long arms 146.

The operation of applying the trucks to the axles is illustrated diagrammatically in Figure 24. In this figure the road wheels 9 are substantially raised above the ground by virtue of the fact that the drums 152 carried thereby engage the tracks 147. The road vehicle is first propelled to the right viewing Figure 24, and the truck 125 is arranged in position to receive the member 140 carried by the forward axle 4, as the vehicle moves down the incline 150. As such movement continues member 140 engages arm 146 causing the truck to move as a unit with the axle to the right of this figure. As the drums 152 move down along the incline 150 the member 140 is caused to be lowered between the arms 145 and 146 and as the downward movement of the drums along said incline continues, the flange 143 of member 140 is brought into engagement with member 144 of the truck. The parts are then secured in assembled relation in any suitable manner. The rear truck is assembled with relation to the rear axle in substantially the same manner with the exception that the vehicle is moved toward the left viewing Figure 24, rather than to the right to bring the parts in assembled relation.

When it is desired to convert the rail car into a road vehicle, it is simply necessary to drive the rail car between the tracks 147 when the drums 152 will engage said tracks thus elevating the road vehicle and withdrawing the member 140 from engagement with members 144 carried by the trucks. Continued movement of the vehicle down one of the inclines 150 will thus result in a separation of the trucks from the axles thus putting the vehicle in condition for operation without further change or alteration as a road vehicle. Substantially the entire weight of the road vehicle is transmitted through the members 140 to the trucks, the road wheels 9 bearing against the belts 136 only with sufficient pressure to insure an effective driving engagement between the resilient tires on the road wheels 9 and said belts. Due to the fact that the coefficient of friction of the resilient tires is relatively high, such pressure need not be great.

In Figs. 27, 28 and 29, a modification of the invention is shown. The form of the invention shown in these figures is especially designed for use in connection with the gas-electric combination shown in Fig. 4 of the drawings. Such a combination embodies a reversible motor and in the form of the invention about to be described, the road wheels 9 must be reversely driven in order to secure rotation of the truck wheels in the direction necessary to propel the rail car forward. The gas-electric combination lends itself peculiarly to this construction in view of the fact that the electric motors may be readily driven at the same speed in their reverse direction. In these figures, the truck axles 153 have journaled thereon, adjacent the truck wheels 154, by universal or other suitable means, brackets 155, having arms extending upwardly and downwardly from said brackets. The truck axles are secured to a transverse supporting member 156 by means of springs 157 pivoted at 158 to one of the arms of the brackets 155 and secured between their ends to said transverse member by clips 159. The transverse supporting member 156 is provided with a trunnion to receive the member 140 secured to axle 4 of the vehicle as above described.

The truck wheels 154 are journaled on the ends of the axles 153 and preferably include integrally connected drums 160 (Figure 29). Endless belts 161 are passed around said drums as shown in Figs. 27 and 28, said belts being arranged to sag between the drums 160 and to engage the driven wheels 9 of the convertible road vehicle. In order to vary the spaced relation of the truck axles 153, and to adjust the tension of the belts carried by the drums secured to the truck wheels, extensible arms 162 are provided. Said arms may be extended by effecting an adjustment of the threaded portions 163 relative to the sockets 164 constituting parts of said extensible arms. A suitable reach rod 165 may be secured to the transverse member 156 and to the corresponding member on the forward truck to hold said trucks in properly spaced relation.

The operation of assembling and disassembling the trucks and the road vehicle in the form of the invention just described is effected in the same way as in the form previously described. In operation, however, the wheels 9 are driven in a direction reverse to that in which they are driven when the road vehicle is caused to move forwardly. When so driven, the truck wheels 154 are caused to be rotated in the proper direction to drive the rail car forwardly. In this form of the invention, it will be observed that all of the truck wheels are separately driven securing a thoroughly efficient construction in that the failure of traction between any one of the truck wheels and the track will not substantially effect the operation of the rail car.

In Figure 30, a modification of the invention is shown whereby a road vehicle having a pair of driven axles arranged adjacent one end thereof may be converted into a rail car. In this figure the road wheels are indicated by the numerals 166 and 167. Said wheels are supported on a six wheel truck embodying three axles 168 held in spaced relation by connecting members 169, which support transverse members 170 and 170' arranged to receive the axles 171 and 171'. Rubber blocks 172 and 172' are positioned between the transverse members 170 and 170' and the axles 171 and 171'. Belts 173 pass over the three truck wheels on the same side of the truck and receive the vehicle wheels 166 and 167 in the manner clearly shown in Fig. 30. In order to provide flexibility in the six wheel truck, suitable flexible joints 173' are provided in the members 169. The rubber blocks 172 and 172' permit slight shifting movement of the transverse members 170 and 170' with respect to the axles 171 and 171', and serve further to provide a resilient cushioned connection between the axles and their trucks. This form of the invention, like that just described is especially adapted for use in connection with road vehicles of the gas-electric type, since the wheels 166 and 167 must be driven reversely in order to secure the forward operation of the truck.

In Figures 31 and 32, a modification is shown of the construction above described in more detail and illustrated in Figs. 27, 28 and 29. In this figure the truck axles are spaced apart by connecting members 174. Said members support a transverse member 175 centrally between the ends of which is arranged a rubber block 176 serving as a rubber kingpin permitting bolster action fore and aft as well as sidewise of the truck. Said block also serves to provide a cushioned connection between the axles and the trucks permitting the movements just specified while at the same time serving to absorb minor shocks to the truck without substantially transmitting them to the axles of the road vehicle.

In Figs. 33, 34, 35 and 36 a still further modification of the invention is shown in which the wheels of the road vehicle are utilized to directly drive the truck wheels without the interposition of belts as above described. In these figures each truck comprises a transverse member 177 secured at its ends to the central portions of connecting members 178, the ends of which are journaled on the axles 179 of the trucks. Secured to the axles 179 for rotation as a unit with said axles are truck wheels 180. The axles 179 are extended beyond the truck wheels 180 to form stub shafts upon which are mounted drums 181 and 182. The drums 181 are journaled on said stub shafts for free relative rotation with respect thereto. As shown in Fig. 35 said drums are arranged diagonally opposite each other. The drums 182 are hollow and are provided internally with gear teeth 183 meshing with planetary gears 184 carried by shafts secured to collars journalled on said shaft (Fig. 33) so that the gears may be bodily movable around the interior of said drum (Fig. 36). The teeth of said gears in turn mesh with teeth 185 carried by the stub shaft upon which said drum is mounted.

The wheels 9 of the road vehicle are positioned between the drums 181 and 182 at each side of the truck with the periphery of the pneumatic tire ordinarily mounted thereon, in contact with said drums. As shown in Figure 33 the drums may be made wide enough to receive, when used in connection with a road vehicle having a pair of driven wheels arranged side by side, both of said driven wheels. In this construction the planetary gears illustrated in Figure 36 are arranged midway between the ends of drum 182 as shown in dotted lines in Figure 33.

In the construction shown in this form of the invention, the axles 4 are preferably supported in U-shaped clips 186 arranged adjacent the connecting members 178 suitable U-shaped rubber liners 187 being arranged between said clip and said axles thus providing a cushioned support for the axles.

The truck illustrated in Figure 35 is the truck that is designed to receive the forward one of the road vehicle axles. This axle carries wheels that are not driven but that are provided with braking mechanism whereby their rotation may be controlled. The wheels 9 bear against the drums 181 and 182 shown in these figures, so that when the brakes are applied to the wheels, the retarding action is transmitted from said wheels to the drum 182 that is connected to the axle 179 of the truck wheels 180. The braking effect is thus applied to the truck wheels of the forward truck, though when the vehicle is being operated, said truck constitutes a pony truck. It will be observed that the planetary gearing causes the truck shafts 179 to rotate in opposite direction to that of the drums 182 and as the drums 182 are caused to rotate in the opposite direction from that of the wheels of the vehicle, it follows that the wheels of the vehicle and the truck wheels in this form of the invention rotate in the same direction, and it is unnecessary to operate the motors reversely in propelling the rail car provided with trucks constructed as just described.

In Figures 37, 38 and 39, a form of the invention is shown in which the wheels for converting the road vehicle into a rail car are adjustably mounted on the road vehicle and provided with means whereby said wheels may be brought into position beneath the road wheels and in position to be driven by said road wheels. As shown in said figures, the axles 188 for the rail wheels 189 are pivotally attached to the frame of the vehicle at 190 by arms 191 disposed at opposite sides of said frame. The axles 188 are journaled in the ends of said arms and have rigidly secured thereto, the flanged wheels 189. Axles 188 have extensions 192 carrying drums 193 and 194. The drums 193 may be loosely journaled on said extensions while the drums 194 and the extensions 192 on which these drums are mounted may be provided with planetary gearing such as shown in Figure 36 whereby the direction of rotation of the axles 188 will be in the same direction as the direction of rotation of the road wheel that is caused to drive them in a manner presently to be described.

The pivots 190 are so disposed that when the arms 191 are in the position indicated in Figure 38 the drums carried by the extensions 192 of the axles 188 are out of engagement with the periphery of the wheel 9. However, when the arms 191 are caused to assume the position shown in Figure 39 the axles 188 are bodily moved downwardly in such position that the drums 193 and 194 engage the periphery of the wheel 9 and so that the flange wheels 189 are brought into position beneath the road wheels and into engagement with the rails 195 upon which the vehicle is to be operated. In order to simultaneously adjust the arms 191, said arms are provided with unitary operating levers 196 having heads 197 provided with nuts journaled therein, that engage the oppositely disposed threads of operating member 198.

In this form of the invention, when it is desired to operate the vehicle as a road vehicle the operating member 198 is manipulated to withdraw the axles 188 to the positions shown in Fig. 38, said operating members serving to maintain said axles and the drums carried thereby in the illustrated position in which they do not interfere with the operation of the vehicle as a road vehicle. When it is desired to convert the road vehicle into a rail car, the vehicle is driven over the rails 195 and elevated by any suitable means such as by the jacks or in the manner illustrated in Figures 23 and 24. The operating member 198 is then manipulated to cause the axles 188 to be lowered in such position that the drums 193 and 194 firmly engage the periphery of the road wheels. The vehicle is then in condition for operation on the rails utilizing the same propelling mechanism and braking mechanism that is ordinarily used in controlling the operation of the vehicle when operated as a road vehicle.

In Figures 40, 41, and 42, a modification of this invention is shown in which a chain drive is used to operate the car when it is converted for use on rails. The construction of the truck and the manner of securing the road vehicle axles is similar to that in Figures 27, 28 and 29 and like reference characters have been used in these figures to indicate the same parts. In these figures, however, the truck wheels 199 are rotatably mounted on the ends of the truck axles 153. The wheels 199 have stub shafts 200 projecting outwardly therefrom. Keyed in any suitable manner to the said stub shafts are sprocket wheels 201. In this form of the invention the road wheels are removed and replaced by sprocket wheels 202 that are detachably secured to the felly 35 of the road wheel in any suitable manner so that the driving and braking torques that are ordinarily applied to the road wheels are communicated through said felly directly to the sprocket wheels 202.

An endless sprocket chain 203 passes over the sprocket wheels 201 and 202 serving to communicate the rotation of the wheel 202 in the same direction to the wheels 201. It will be observed that in this form of the invention all of the truck wheels on the same side of the car are controlled directly by the felly of the nearest road wheel. The tension of the sprocket chain may be adjusted by manipulating the members 162 and 163 as described in connection with Figures 27, 28 and 29.

The truck axles and rail wheels of conventional form attached thereto provide an electrically conducting path from rail to rail in well known manner. Connection of the truck to vehicle axles 4 and 4a provides an electrically conducting path from the vehicle to the rails. This feature of my invention may be utilized for track circuit operation of signals, the signal circuit being completed from rail to rail through the rail wheels and axles, and for a convenient electrically conducting path from the vehicle to the rails through the connection of the tracks to the vehicle axles, whereby a ground return may be provided for electrical propulsion current if it is desired to operate the vehicle by the electrical driving means 16b hereinbefore mentioned with current from a remote source.

The vehicle equipped according to my invention for operation on rails is driven and supported on pneumatic tires, which are of electrical insulating material, and when so equipped, signal operation and ground return of propulsion current is provided.

In the embodiment illustrated by Figure 20 truck axles 129 and rail wheels 130 of conventional form provide a conducting path from rail to rail. Trunnion members 144, 140 and clips 141 provide a conducting path from the vehicle to the rails.

In Figures 43, 44 and 45 a novel manner of heating and ventilating a car provided with internal combustion engines arranged adjacent the sides of the car is shown diagrammatically, arrows indicating the direction of flow of the air through the car body. As shown in this figure, openings 204 are provided in the forward end of the car body, said openings being so disposed that as the car moves forward, air is caused to enter the car body. As the air thus entering the car body is relatively cool it will flow towards the rear of the car adjacent the floor thereof, toward openings 205 provided in the floor of the body adjacent the recess in which the engine 17 is located. As shown in Figure 44 the engine 17 and the radiator 17a are provided with cooling air drawn inwardly through the forward louvre openings 54a in the car side by a fan 17b operating in the usual manner. The air thus drawn through said louvre openings is discharged as indicated by the arrows in said figure through the openings located to the rear of engine 17. The flow of air as just indicated creates a suction that affects the openings 205 creating a circulation through said openings from the interior of the car through the radiator and over the engine 17. The relatively cool air that entered the car body in the openings 204 is thus drawn through the warm radiator and over the warm engine where it is heated and caused to again enter the car body by the fan 17b through a trap door 53h in the member 53 positioned over the engine as indicated in Figure 45. The circulation thus set up also tends to draw fresh air through the louvre openings over the engine and into the car body through the door 53h as indicated by the arrows 206 in Figure 45. Suitable discharge openings 207 of conventional form may be provided in the roof of the car body to discharge the stale air from the interior of the body after circulation through the car body as indicated by the arrows in Figure 43. By the arrangement just described the car body may be effectively heated and ventilated utilizing the internal combustion engines and the fan ordinarily associated therewith to serve these purposes. The use of separate heaters is thus avoided. At the same time the location of the internal combustion engines centrally between the ends of the car body and the provision of openings arranged as just described serve to produce an even temperature throughout the car body without the expenditure of additional fuel in order to serve the heating function.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. Accordingly, what is desired to be secured by Letters Patent and is claimed as new is:

1. A rail car comprising a frame, a plurality of axles arranged beneath said frame and resiliently connected thereto, mechanism to detachably connect a pair of road wheels to shafts secured to each of said axles, power means mounted on said frame and operatively connected to certain of said shafts, mechanism to brake certain of said shafts at the will of the operator of the car, a truck embodying a plurality of pairs of rail wheels arranged beneath each axle, and means operatively connecting said shafts and a plurality of said rail wheels whereby said rail wheels are controlled from said shafts.

2. A rail car comprising a frame, axles beneath said frame, springs interconnecting said frame and axles, shafts connected to said axles and designed to receive road wheels, a truck having a plurality of flanged wheels arranged beneath each of said axles and mechanism designed to be operatively coupled to said shafts and to certain of said truck wheels for driving said wheels from said shafts.

3. A rail car comprising a frame, axles beneath said frame, springs interconnecting said frame and axles, shafts connected to said axles and designed to receive road wheels, a truck removably secured beneath each axle for pivotal movement about a vertical axis, and mechanism operatively connecting said shafts and trucks, said mechanism permitting pivotal movement of said trucks about their axes without substantially effecting the driving of said trucks from said shafts.

4. A rail car comprising a frame, axles beneath said frame, springs interconnecting said frame and axles, shafts connected to said axles, removable road wheels carried by said shafts, a truck embodying a plurality of flanged wheels secured beneath each axle for pivotal movement about a vertical axis, and mechanism for operatively connecting said shafts to said trucks including endless driving members that permit the shifting of the trucks about their vertical axes without affecting the operation of said mechanisms.

5. A rail car comprising a frame, a pair of power units, supported on said frame in widely spaced apart lateral relation, axles yieldingly connected to said frame, road wheels on said axles some of which are independently driven, a truck removably secured to each axle, one of said trucks including mechanism arranged to be engaged by said independently driven wheels and to support said wheels, so that said wheels will independently drive the wheels at opposite sides of said truck.

6. A rail car comprising a box-like body of relatively light structural material, a pair of internal combustion engines arranged adjacent the sides of said body in widely spaced apart relation, a pair of axles supported on readily removable road wheels arranged beneath said body, springs interconnecting said axles and body, a removable truck including a plurality of pairs of flanged wheels arranged beneath each axle to support said body and axle, and mechanism operatively connecting said road and truck wheels so that each of said road wheels drives a pair of said truck wheels.

7. A convertible road or rail car comprising a car body, axles arranged beneath said car body, springs interconnecting said axles and body, road wheels on said axles, self contained power means supported on said body and operatively connected to certain of said road wheels, braking means to control said road wheels, a detachable truck arranged beneath each of said axles and secured thereto by a trunnion connection permitting pivotal movement of said truck relative to said axles about vertical axes and means operatively connecting said road wheels and said truck so that said trucks may be operated and controlled from said road wheels.

8. A convertible road or rail car comprising a car body, axles arranged beneath said car body, springs interconnecting said axles and body, road wheels on said axles, self contained power means supported on said body and operatively connected to certain of said road wheels, braking means to control said road wheels, a detachable truck arranged beneath each of said axles and secured thereto by a trunnion connection permitting pivotal movement of said truck relative to said axles about vertical axes and means including pulleys operatively connected to the truck wheels and belts for operating and controlling said trucks from said road wheels.

9. A truck for converting a road vehicle into a rail car comprising a frame provided with a trunnion element, a second trunnion element cooperating with said first trunnion element and provided with means for its ready attachment to an axle of a road vehicle, a plurality of pairs of truck wheels supporting said frame and driving means for said truck wheels arranged to be actuated by the road wheels of the road vehicle.

10. A truck for converting a road vehicle into a rail car comprising a frame provided with a trunnion element, a second trunnion element journaled in said first named trunnion element and provided with a socket to receive the axle of the road vehicle, a plurality of pairs of truck wheels supporting said frame and driving means for said truck wheels including endless driving elements operatively connected to the driven axle of said road vehicle and to said truck wheels.

11. A truck for converting a road vehicle into a rail car comprising a frame provided with a trunnion element, a second trunnion element cooperating with said first trunnion element and provided with means for its ready attachment to an axle of a road vehicle, a plurality of pairs of truck wheels supporting said frame, a pair of pulleys on each side of said truck operatively connected with the truck wheels on the same side, and endless belts passing over the pulleys on the same side of the truck, said endless belts being disposed to receive and be driven by the road wheels.

12. A truck for converting a road vehicle into a rail car including a frame embodying means whereby said frame may be readily attached to an axle of the road vehicle to support substantially the entire weight of said vehicle, a pair of truck axles each supported by a pair of flanged wheels yieldingly secured to said frame, drive shafts parallel to said truck axles and each embodying means in driving engagement with said truck axles, pulleys on opposite ends of each of said drive shafts and endless belts passing over the pulleys on the same side of the truck, said belts being disposed to receive and be driven by the wheels on the axle supported by said truck.

13. A detachable truck for converting a road vehicle into a rail car comprising a frame provided with means to engage and be readily connected to an axle of the road vehicle, a pair of truck axles yieldingly supporting said frame, a pair of rail wheels supporting each axle. drums extending outwardly from said wheels and rigidly connected thereto, and endless belts passing around the drums on the same side of the truck and arranged in position to be brought into driving engagement with a road wheel when the axle of the road vehicle is received by said truck.

14. A detachable truck for converting a road vehicle into a rail car comprising a supporting member provided with trunnion elements relatively movable about a vertical axis, one of said trunnion elements being provided with means to receive and have detachably secured thereto an axle of the road vehicle, a pair of truck axles disposed at opposite sides of said supporting member, each axle being provided adjacent each end thereof with a connecting member journaled on said axle and having arms extending in opposite directions therefrom, springs connected to said supporting member between their ends and connected at each end to one end of each of said arms, a pair of rail wheels supporting each axle, means including endless belts passing over pulleys provided at the same side of the truck for driving said wheels and adjustable means connected to the other of said arms whereby the tension of said belts may be adjusted.

15. A truck for converting a road vehicle into a rail car comprising a pair of axles each supported by a pair of flanged wheels, means for driving each of said flanged wheels from the wheels of the road vehicle, means for detachably connecting an axle of the road vehicle to said truck including a resilient kingpin disposed between said truck and said axle, said kingpin being flexible in a plurality of directions.

16. A convertible road vehicle or rail car comprising a vehicle frame, a plurality of axles each supported by a pair of road wheels arranged beneath said frame, springs connecting said axles and frame, a pair of truck axles for each axle provided with flanged wheels adjacent each end thereof and with means for driving each flanged wheel, each of said truck axles being swingingly secured to said frame, and means for simultaneously swinging said truck axles so that the flanged wheels thereon engage rails and with the means for driving the wheels on said truck axles in engagement with the periphery of the road wheels on the axle adjacent which said truck axles are connected.

17. A convertible road vehicle or rail car comprising a vehicle frame, a plurality of axles each supported by a pair of road wheels arranged beneath said frame, springs connecting said axles and frame, a pair of truck axles for each axle provided with flanged wheels adjacent each end thereof, each of said truck axles being swingingly secured to said frame for movement in opposite directions with respect to the adjacent axle, means for simultaneously swinging said truck axles and for holding them in their adjusted position, means connected with said truck axles for simultaneous adjustment therewith, said last named means being arranged to engage the road wheels when the truck axles are in their operative position and to be out of engagement with said wheels when the truck axles are in their inoperative position.

18. A road vehicle designed for ready conversion into a rail car including drums projecting outwardly substantially beyond the sides of said road wheels whereby the road vehicle may be elevated for application to trucks by engagement of said drums with spaced inclined tracks.

19. The method of inserting trucks beneath a road vehicle to convert it into a rail car which consists in providing the wheels of said road vehicle with drums projecting outwardly therefrom, providing raised tracks having inclined ends spaced apart a distance substantially equal to the spacing of said drums on each of the road axles, driving said road vehicle on said tracks with the drums engaging the tracks to raise the vehicle wheels substantially above the ground, inserting rail trucks beneath the axles with a portion thereof in engagement with a part connected to a road axle and then driving said vehicle down an inclined portion of said tracks to cause the road axle and the wheels to be brought into engagement with the truck arranged therebeneath.

20. The method of inserting trucks beneath a road vehicle to convert it into a rail car which consists in raising the road vehicle including the wheels a substantial distance above the ground by means engaging projections extending away from the wheels of the road vehicle, inserting said trucks beneath the road vehicle with the wheels thereof out of alignment with the road wheels and then lowering said road vehicle until the axles thereof are in engagement with said trucks so that the weight is supported by the trucks and until the wheels of the road vehicle are in engagement with means for driving the trucks from said wheels.

21. A convertible road and rail vehicle comprising a vehicle frame, axles, each of said axles carrying a pair of resilient tired road wheels, springs interconnecting said axles and frame, and a truck having rail wheels arranged beneath each axle in a manner to constitute the main support for said axles and the parts connected thereto, and means to cause certain of said road wheels to operate and control said rail wheels.

22. A convertible road and rail vehicle comprising a vehicle frame, axles, each of said axles carrying a pair of resilient tired road wheels, springs interconnecting said axles and frame, and a four wheel truck arranged beneath each axle so as to constitute the main support for each axle and the parts connected thereto, and means to cause said road wheels to operate and control said rail wheels, said last named means being arranged so that the lowest point of said road wheels is as low as the plane containing the axes of rotation of said rail wheels, whereby the disposition of said trucks does not substantially raise the center of gravity of the rail vehicle.

23. A convertible road or rail vehicle, comprising a vehicle frame, axles, springs connecting the axles and frame, road vehicle brakes, power means supported on said frame and operatively connected to said axles, a truck supported by rail wheels disposed beneath and arranged to support said axles and the parts connected thereto, and mechanism interconnecting said axles and said rail wheel whereby said power means and brakes may be utilized to control the rail vehicle.

24. In a rail vehicle embodying a frame and power means thereon, a supplemental truck including a frame, pneumatic tired driving and guiding means associated therewith for guiding the vehicle on the rails and transmitting power thereto from said power means.

25. In a rail vehicle embodying a frame and power means thereon, a supplemental truck including a frame, pneumatic tired driving means associated with said supplemental truck for transmitting power from said power means to the rails.

26. A supplemental truck for a vehicle embodying a body of relatively light structural material, power means on said body, said truck comprising a frame, rail wheels and driving means including pneumatic tires for transmitting power from said power means to the rails.

27. A vehicle adapted for operation on rails embodying a light wheel carrying frame; axles, each of said axles carrying a pair of pneumatic tired wheels; resilient means interconnecting said axles and frame; power transmission means to said wheels, in combination with means for guiding said vehicle and transmitting the power of said vehicle to the rails including said pneumatic tires, said guide means being detachable and in contact with the rail, and arranged so that the driving portion of said pneumatic tired wheels is below the plane of the axis of said guide means.

28. A vehicle adapted for operation on rails embodying a light wheel carrying frame; axles, each of said axles carrying a pair of pneumatic tired wheels; resilient means interconnecting said axles and frame; power transmission means to said wheels, in combination with means for guiding said vehicle, and transmitting the power of said vehicle to the rails including said pneumatic tires, said guiding means being detachable, and in contact with the rail.

29. A vehicle adapted for operation on rails embodying a light wheel carrying frame; axles, each of said axles carrying a pair of pneumatic tired wheels; resilient means interconnecting said axles and frame; power transmission means to said wheels, in combination with means for guiding said vehicle, and transmitting the power of said vehicle to the rails including said pneumatic tires.

30. A vehicle adapted for operation on rails embodying a box-like body of relatively light structural material; axles between the ends and substantially equidistant from the center thereof, each of said axles carrying a pair of pneumatic tired wheels; resilient means interconnecting said axles and frame; power transmission means to said wheels, in combination with means for guiding said vehicle and transmitting the power of said vehicle to the rails including said pneumatic tires, said guide means being in contact with the rail, and arranged so that the driving portion of said pneumatic tired wheels is below the plane of the axis of said guide means.

31. A vehicle adapted for operation on rails embodying a light wheel carrying frame; axles, each of said axles carrying a pair of pneumatic tired wheels; resilient means interconnecting said axles and frame; power means comprising internal combustion engines arranged adjacent the sides of the body in combination with detachable means for guiding said wheels and transmitting the power of said vehicle to the rails including said pneumatic tires, said guide means being arranged so that the driving portion of said pneumatic tired wheels is below the plane of the axis of said guide means.

32. A vehicle adapted for operation on rails embodying a light wheel carrying frame; axles, each of said axles carrying a pair of pneumatic tired wheels; resilient means interconnecting said axles and frame; power means comprising an internal combustion engine supported on said frame in combination with means for guiding said vehicle and transmitting the power of said vehicle to the rails including said pneumatic tires.

33. A vehicle adapted for operation on rails embodying a light wheel carrying frame and body structure; axles, each of said axles carrying a pair of pneumatic tired wheels; resilient means interconnecting said axles and frame; power means comprising an internal combustion engine supported from said body structure, in combination with means for guiding said vehicle and transmitting the power of said vehicle to the rails including said pneumatic tires, said means being detachable and in contact with the rail.

34. A vehicle adapted for operation on rails embodying a box like body of relatively light structural material; axles between the ends and substantially equidistant from the center thereof, each of said axles carrying a pair of pneumatic tired wheels; resilient means interconnecting said axles and body; power means comprising an internal combustion engine supported between said axles for transmitting power to said wheels in combination with a detachable guide member for each wheel in contact with the rails to guide said pneumatic tires, said guide member being arranged so that the driving portion of said pneumatic tired wheels is below the plane of the axis of said guide member.

35. A vehicle adapted for operation on rails comprising a light vehicle frame; axles, each of said axles carrying a pair of pneumatic tired wheels; springs interconnecting said axles and frame; power transmission means to the rails including said pneumatic tired wheels and guide wheels, said guide wheels being located forwardly and to the rear of said tired wheels whereby the lowest point of said tired wheels is below the axis of the guide wheels.

36. A vehicle adapted for operation on rails comprising a light vehicle frame; axles, each of said axles carrying a pair of pneumatic tired wheels; springs interconnecting said axles and frame; power transmission means to the rails including said pneumatic tired wheels and a guide wheel, said guide wheel being located forwardly of said tired wheels.

37. A vehicle adapted for operation on rails comprising a light vehicle frame; axles, each of said axles carrying a pair of pneumatic tired wheels; springs interconnecting said axles and frame; power transmission means to the rails including said pneumatic tired wheels and guide wheels, said guide wheels being located forwardly and to the rear of said tired wheels.

38. A vehicle adapted for operation on rails comprising a light vehicle frame; axles, each of said axles carrying a pair of pneumatic tired wheels, springs interconnecting said axles and frame; power transmission means to the rails including said pneumatic tired wheels and guide wheels, said guide wheels being located forwardly of said tired wheels, the lowest point of said tired wheels being below the axis of the guide wheels.

39. In a rail vehicle embodying a frame and power means thereon, a supplemental truck including a frame, pneumatic tired driving means associated with said supplemental truck for transmitting power from said power means to the rails said supplemental truck providing an electrically conducting path from the vehicle to the rails and from rail to rail.

40. A vehicle adapted for operation on rails embodying a light wheel carrying frame; axles, each of said axles carrying a pair of pneumatic tired wheels; resilient means interconnecting said axles and frame; power transmission means to said wheels, in combination with means for guiding said vehicle, and transmitting the power of said vehicle to the rails including said penumatic tires; said last mentioned means providing an electrically conducting path whereby passage of the vehicle over the rails completes track signal circuits.

41. The combination of claim 40 wherein the last mentioned means provides an electrically conducting path from the vehicle to the rails.

In testimony whereof I affix my signature.

FRANK R. FAGEOL.